(12) United States Patent
Asterjadhi et al.

(10) Patent No.: US 12,089,194 B2
(45) Date of Patent: Sep. 10, 2024

(54) TECHNIQUES FOR SELECTING NETWORK PARAMETERS BASED ON FEEDBACK

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/399,100

(22) Filed: Apr. 30, 2019

(65) Prior Publication Data
US 2019/0342891 A1 Nov. 7, 2019

Related U.S. Application Data

(60) Provisional application No. 62/665,415, filed on May 1, 2018.

(51) Int. Cl.
*H04W 72/0453* (2023.01)
*H04B 7/0417* (2017.01)
(Continued)

(52) U.S. Cl.
CPC ....... *H04W 72/0453* (2013.01); *H04W 72/21* (2023.01)

(58) Field of Classification Search
CPC ......... H04W 72/0453; H04W 72/0413; H04W 72/21
(Continued)

(56) References Cited

U.S. PATENT DOCUMENTS

2008/0316952 A1* 12/2008 Gruber ............... H04W 72/005
370/312
2010/0208608 A1* 8/2010 Wang ................. H04W 52/325
370/252
(Continued)

FOREIGN PATENT DOCUMENTS

CN 107637050 A 1/2018
EP 3133757 A1 2/2017
(Continued)

OTHER PUBLICATIONS

International Search Report and Written Opinion—PCT/US2019/030225—ISA/EPO—Jun. 13, 2019 (183018WO).
(Continued)

*Primary Examiner* — Xuan Lu
(74) *Attorney, Agent, or Firm* — Holland & Hart / Qualcomm

(57) ABSTRACT

Techniques are described herein for selecting network parameters based on feedback in a wireless network. An access point (AP) may collect feedback information from a plurality of stations (STAs). The AP may broadcast out queries seeking information to the STAs. The AP may collect statistics about network parameters preferred by the STAs. The AP may select a network parameter based at least in part on collecting the statistics. The AP may collect the statistics without identifying the individual STAs that are responding. The AP may gather responses using a two-message system, where a first message informs the STAs about the feedback being requested and a second message requests that the STAs transmit the feedback to the AP.

30 Claims, 19 Drawing Sheets

(51) Int. Cl.
*H04B 7/06* (2006.01)
*H04W 4/70* (2018.01)
*H04W 24/10* (2009.01)
*H04W 48/12* (2009.01)
*H04W 72/21* (2023.01)
*H04W 84/12* (2009.01)
*H04W 88/08* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2010/0322102 | A1* | 12/2010 | Zhou | H04L 1/0029 |
| | | | | 370/252 |
| 2011/0211487 | A1* | 9/2011 | Han | H04W 16/28 |
| | | | | 370/252 |
| 2012/0178444 | A1 | 7/2012 | Wang et al. | |
| 2014/0086200 | A1* | 3/2014 | Seok | H04L 5/003 |
| | | | | 370/330 |
| 2014/0119178 | A1 | 5/2014 | Zhao et al. | |
| 2014/0192659 | A1* | 7/2014 | Tian | H04W 72/0453 |
| | | | | 370/335 |
| 2014/0254400 | A1* | 9/2014 | Zhou | H04L 1/0026 |
| | | | | 370/252 |
| 2015/0117346 | A1 | 4/2015 | Lin et al. | |
| 2015/0195074 | A1 | 7/2015 | Eriksson et al. | |
| 2015/0208436 | A1* | 7/2015 | Seok | H04W 74/08 |
| | | | | 370/329 |
| 2015/0237513 | A1* | 8/2015 | Garrett | H04L 25/0228 |
| | | | | 370/252 |
| 2016/0277315 | A1 | 9/2016 | Miller et al. | |
| 2016/0353474 | A1 | 12/2016 | Zhang et al. | |
| 2017/0070914 | A1* | 3/2017 | Chun | H04L 1/0075 |
| 2017/0070950 | A1* | 3/2017 | Bajko | H04W 48/20 |
| 2017/0302355 | A1* | 10/2017 | Islam | H04L 5/0051 |
| 2017/0324508 | A1 | 11/2017 | Vanninen et al. | |
| 2019/0007854 | A1* | 1/2019 | Chen | H04L 5/0091 |
| 2019/0007946 | A1* | 1/2019 | Yerramalli | H04W 72/0453 |
| 2019/0052398 | A1* | 2/2019 | Prasad | H04L 1/0026 |
| 2019/0089424 | A1* | 3/2019 | Cariou | H04W 74/06 |
| 2019/0123923 | A1* | 4/2019 | Belleschi | H04W 4/40 |
| 2019/0313328 | A1* | 10/2019 | Ma | H04B 17/327 |

FOREIGN PATENT DOCUMENTS

| | | |
|---|---|---|
| WO | WO-2014066831 A1 | 5/2014 |
| WO | WO-2016191523 | 12/2016 |

OTHER PUBLICATIONS

Jiang J., et al., "An Improved Dynamic Frequency Selection Algorithm Based on Joint Optimization in WLAN", Telecommunication Engineering, Jul. 20, 2013, vol. 53. No.7, pp. 873-877.

NTT Docomo Inc: "Status Report of WI on New Radio (NR) Access Technology, TSG RAN WG1", 3GPP TSG RAN Meeting #76, RP-171137, West Palm Beach, USA, Jun. 5-8, 2017, 118 Pages, May 29, 2017.

Zhang J., "RF Temperature Measurement System Based on the SiAICN Temperature Sensor's S11 Parameter Test", May 5, 2017, China Integrated Circuit, pp. 63-65.

\* cited by examiner

| 204 | 206 | 208 | 210 | 212 | 214 | 216 | 218 |
|---|---|---|---|---|---|---|---|
| L-STF | L-LTF | L-SIG | VHT-SIG-A | VHT-STF | VHT-LTFs | VHT-SIG-B | Data |

{202 braces 204, 206, 208}

| 224 | 226 | 228 | 230 | 232 | 234 | 236 | 238 | 240 |
|---|---|---|---|---|---|---|---|---|
| L-STF | L-LTF | L-SIG | RL-SIG | HE-SIG-A | HE-SIG-B | HE-STF | HE-LTFs | Data |
| L-STF | L-LTF | L-SIG | RL-SIG | HE-SIG-A | | | | |
| L-STF | L-LTF | L-SIG | RL-SIG | HE-SIG-A | | | | |
| L-STF | L-LTF | L-SIG | RL-SIG | HE-SIG-A | | | | |

{222 braces 224, 226, 228, 230, 232}

TECHNIQUES FOR SELECTING NETWORK PARAMETERS BASED ON FEEDBACK

CROSS REFERENCE

The present application for patent claims the benefit of U.S. Provisional Patent Application No. 62/665,415 by Asterjadhi, et al., entitled "TECHNIQUES FOR SELECTING NETWORK PARAMETERS BASED ON FEEDBACK," filed May 1, 2018, assigned to the assignee hereof, and expressly incorporated by reference in its entirety herein.

TECHNICAL FIELD

This disclosure relates generally to wireless communications, and more specifically to techniques to request information from other devices and to select network parameters based on the information.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish a communication link with the WLAN, maintain a communication link with the WLAN, or do both. In a typical WLAN, each STA may be associated with only one AP at a time. To identify an AP with which to associate, a STA is configured to perform scans on the wireless channels of each of one or more frequency bands (for example, the 2.4 GHz band, the 5 GHz band, the 6 GHz band, or a combination thereof). As a result of the increasing ubiquity of wireless networks, a STA may have the opportunity to select one of many WLANs within range of the STA, select among multiple APs that together form an extended BSS, or do both. After association with an AP, a STA also may be configured to periodically scan its surroundings to find a more suitable AP with which to associate. For example, a STA that is moving relative to its associated AP may perform a "roaming" scan to find an AP having more desirable network characteristics such as a greater received signal strength indicator (RSSI).

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

In some wireless communications systems, APs are servicing greater numbers of STAs. As the number of STAs increases, the amount of control signaling used to maintain communication links may also increase.

SUMMARY

The systems, methods and devices of this disclosure each have several innovative aspects, no single one of which is solely responsible for the desirable attributes disclosed herein.

A method of wireless communication by an access point is described. The method may include broadcasting, to a set of stations, an indication requesting feedback associated with one or more network parameters, broadcasting, to the set of stations, a request for transmission of the feedback identified in the indication, receiving, from at least one of the plurality of stations, feedback based at least in part on the indication requesting feedback and the request for transmission of the feedback, determining one or more characteristics of a plurality of channels based at least in part on the feedback, the one or more characteristics indicating one or more network parameters identified by the plurality of stations in response to broadcasting the request, and selecting a network parameter based on the determination. In some implementations, the one or more characteristics may be associated with or provide one or more network parameters identified by the set of stations in response to broadcasting the request.

An apparatus for wireless communication by an access point is described. The apparatus may include a processor, memory in electronic communication with the processor, and instructions stored in the memory. The instructions may be executable by the processor to cause the apparatus to broadcast, to a set of stations, an indication requesting feedback associated with one or more network parameters, broadcast, to the set of stations, a request for transmission of the feedback identified in the indication, receive, from at least one of the plurality of stations, feedback based at least in part on the indication requesting feedback and the request for transmission of the feedback, determine one or more characteristics of a plurality of channels based at least in part on the feedback, the one or more characteristics indicating one or more network parameters identified by the set of stations in response to broadcasting the request, and select a network parameter based on the determination. In some implementations, the one or more characteristics may be associated with or provide one or more network parameters identified by the set of stations in response to broadcasting the request.

Another apparatus for wireless communication by an access point is described. The apparatus may include means for broadcasting, to a set of stations, an indication requesting feedback associated with one or more network parameters, broadcasting, to the set of stations, a request for transmission of the feedback identified in the indication, receive, from at least one of the plurality of stations, feedback based at least in part on the indication requesting feedback and the request for transmission of the feedback, determine one or more characteristics of a plurality of channels based at least in part on the feedback, the one or more characteristics indicating one or more network parameters identified by the set of stations in response to broadcasting the request, and selecting a network parameter based on the determination. In some implementations, the one or more characteristics may be associated with or provide one or more network parameters identified by the set of stations in response to broadcasting the request.

A non-transitory computer-readable medium storing code for wireless communication by an access point is described. The code may include instructions executable by a processor to broadcast, to a set of stations, an indication requesting feedback associated with one or more network parameters, broadcast, to the set of stations, a request for transmission of the feedback identified in the indication, receive, from at least one of the plurality of stations, feedback based at least in part on the indication requesting feedback and the request for transmission of the feedback, determine one or more characteristics of a plurality of channels based at least in part on the feedback, indicating one or more network parameters identified by the set of stations in response to broadcasting the request, and select a network parameter based on the determination. In some implementations, the one or more characteristics may be associated with or provide one or more network parameters identified by the set of stations in response to broadcasting the request.

In some examples of the method, apparatuses, and non-transitory computer-readable medium described herein, receiving the feedback may include operations, features, means, or instructions for receiving, by the access point, a response from at least one of the set of stations that includes data indicating the network parameters identified by the set of stations, the determination of the one or more characteristics being based at least in part on the data.

In some examples of the method, apparatuses, and non-transitory computer-readable medium described herein, the data includes a single bit representing a binary response to the indication requesting feedback, or a set of bits representing a value in response to the indication requesting feedback, or a combination thereof.

Some examples of the method, apparatuses, and non-transitory computer-readable medium described herein may further include operations, features, means, or instructions for selecting a list of channel candidates to serve as a primary channel for the access point, where the indication includes the list of channel candidates and the selected network parameter may be one of the channel candidates.

In some examples of the method, apparatuses, and non-transitory computer-readable medium described herein, each channel of the plurality of channels may be a channel candidate from the list of channel candidates.

In some examples of the method, apparatuses, and non-transitory computer-readable medium described herein, the indication includes a primary channel number (PCN) field for each channel candidate of the list of channel candidates.

In some examples of the method, apparatuses, and non-transitory computer-readable medium described herein, receiving the feedback may include operations, features, means, or instructions for detecting energy levels, or energy patterns, or other signal statistics, on at least one channel of the plurality of channels, the determination of the one or more characteristics being based at least in part on the detected energy levels, or energy patterns, or other signal statistics, and the detected energy levels, or energy patterns, or other signal statistics being configured to indicate the one or more preferred network parameters identified by the plurality of stations in response to broadcasting the request.

Some examples of the method, apparatuses, and non-transitory computer-readable medium described herein may further include operations, features, means, or instructions for comparing energy detected on a first channel to energy detected on a second channel, where selecting the network parameter may be based on a difference in the energy detected on the first channel and the energy detected on the second channel.

In some examples of the method, apparatuses, and non-transitory computer-readable medium described herein, the one or more characteristics include at least one of an energy detected on at least one channel of the plurality of channels, a quantity of stations using at least one channel of the plurality of channels, a quantity of stations contending for access to at least one channel of the plurality of channels, a quantity of packets being communicated over at least one channel of the plurality of channels, or a quantity of packets.

Some examples of the method, apparatuses, and non-transitory computer-readable medium described herein may further include operations, features, means, or instructions for identifying the feedback received from the set of stations without identifying any of the set of stations, where selecting the network parameter may be based on identifying the feedback.

Some examples of the method, apparatuses, and non-transitory computer-readable medium described herein may further include operations, features, means, or instructions for transmitting the selected network parameter to the set of stations.

Some examples of the method, apparatuses, and non-transitory computer-readable medium described herein may further include operations, features, means, or instructions for selecting a list of frequency spectrum band candidates associated with a primary channel for the access point, where the indication includes the list of frequency spectrum band candidates and the selected network parameter may be one of the frequency spectrum band candidates.

Some examples of the method, apparatuses, and non-transitory computer-readable medium described herein may further include operations, features, means, or instructions for selecting a list of basic service set (BSS) candidates associated with a primary channel for the access point, where the indication includes the list of BSS candidates and the selected network parameter may be one of the BSS candidates.

Some examples of the method, apparatuses, and non-transitory computer-readable medium described herein may further include operations, features, means, or instructions for mapping a set of responses to the indication to the plurality of channels, where selecting the network parameter may be based on the mapping of the set of response to the plurality of channels.

Some examples of the method, apparatuses, and non-transitory computer-readable medium described herein may further include operations, features, means, or instructions for identifying a spatial reuse parameter for a BSS, where the indication requesting feedback includes the spatial reuse parameter.

In some examples of the method, apparatuses, and non-transitory computer-readable medium described herein, the network parameters included in the indication include a level of interference detected from a neighbor, a type of a spatial reuse mechanism, a preamble detection threshold, an energy detection threshold, a mid-amble detect threshold, or a BSS operating channel width, or a combination thereof.

Some examples of the method, apparatuses, and non-transitory computer-readable medium described herein may further include operations, features, means, or instructions for identifying a transmit power control parameter, where the indication requests a transmit power level for a BSS.

Some examples of the method, apparatuses, and non-transitory computer-readable medium described herein may further include operations, features, means, or instructions for selecting a list of BSS color candidates, where the indication requesting feedback includes a list of BSS color candidates, where one of the selected BSS color candidates may be the selected network parameter.

In some examples of the method, apparatuses, and non-transitory computer-readable medium described herein, the indication requesting feedback includes a request for a list radio access technologies accessible by the set of stations, a request for a signal-to-interference-plus-noise ratio (SINR) for a certain channel, a request for a received signal strength indication (RSSI) for the certain channel, a request for a number of corrupted frames received within a MAC protocol data unit (MPDU), a request to identify corrupted frames, a request for instantaneous interference levels for the certain channel, a request for a multicast rate selection, a request for a minimum contention window adjustment based on a number of collisions or retransmission experienced by the set of stations, or an enhanced distributed Coordination access (EDCA) parameter adjustment based on a number of collisions or retransmission experienced by the set of stations, or a combination thereof.

In some examples of the method, apparatuses, and non-transitory computer-readable medium described herein, the indication may be included in a beacon frame, and where the request may be included in a feedback report poll trigger frame. In some implementations, the feedback report poll trigger frame may be a type or a variant of a null data packet (NDP) feedback report poll trigger frame (NFRP) Trigger frame.

Some examples of the method, apparatuses, and non-transitory computer-readable medium described herein may further include operations, features, means, or instructions for identifying a target beacon transmit time for broadcasting the request, where the indication includes the target beacon transmit time. In some implementations, the target beacon is a target feedback request.

In some examples of the method, apparatuses, and non-transitory computer-readable medium described herein, the target beacon transmit time indicates a duration between broadcasting the indication and broadcasting the request, or the target beacon transmit time indicates a counter of beacons between broadcasting the indication and broadcasting the request, or indicates a time at which the access point will modify the one or more network parameters identified in the indication.

In some examples of the method, apparatuses, and non-transitory computer-readable medium described herein, the request includes a type of the feedback requested, a range of the indication requesting feedback, a class of stations to respond to the indication requesting feedback, or a combination thereof.

In some examples of the method, apparatuses, and non-transitory computer-readable medium described herein, the class of stations includes stations associated with the access point, stations not associated with the access point, stations associated with other access points, other access points, or a combination thereof.

In some examples of the method, apparatuses, and non-transitory computer-readable medium described herein, the plurality of channels is a network. In some examples of the method, apparatuses, and non-transitory computer-readable medium described herein, the plurality of stations includes one or more of stations associated with the access point, stations intending to associate with the access point, other access points that are within transmission range of the access point, stations associated to other access points that are within transmission range of the access point. In some examples of the method, apparatuses, and non-transitory computer-readable medium described herein, the indication or the request includes an identification of stations that are permitted to provide feedback.

A method of wireless communication by a station is described. The method may include receiving, from an access point, an indication requesting feedback from the station associated with one or more network parameters, selecting a network parameter based on receiving the indication, receiving, from the access point, a request for transmission of the feedback identified in the indication to the access point, and transmitting, on a channel, one or more characteristics indicating the selected network parameter based on receiving the request.

An apparatus for wireless communication by a station is described. The apparatus may include a processor, memory in electronic communication with the processor, and instructions stored in the memory. The instructions may be executable by the processor to cause the apparatus to receive, from an access point, an indication requesting feedback from the station associated with one or more network parameters, select a network parameter based on receiving the indication, receive, from the access point, a request for transmission of the feedback identified in the indication to the access point, and transmit, on a channel, one or more characteristics indicating the selected network parameter based on receiving the request.

Another apparatus for wireless communication by a station is described. The apparatus may include means for receiving, from an access point, an indication requesting feedback from the station associated with one or more network parameters, selecting a network parameter based on receiving the indication, receiving, from the access point, a request for transmission of the feedback identified in the indication to the access point, and transmitting, on a channel, one or more characteristics indicating the selected network parameter based on receiving the request.

A non-transitory computer-readable medium storing code for wireless communication by a station is described. The code may include instructions executable by a processor to receive, from an access point, an indication requesting feedback from the station associated with one or more network parameters, select a network parameter based on receiving the indication, receive, from the access point, a request for transmission of the feedback identified in the indication to the access point, and transmit, on a channel, one or more characteristics indicating the selected network parameter based on receiving the request.

In some examples of the method, apparatuses, and non-transitory computer-readable medium described herein, transmitting the one or more characteristics on the channel may include operations, features, means, or instructions for transmitting, to the access point, a response that includes data indicating the selected network parameter.

In some examples of the method, apparatuses, and non-transitory computer-readable medium described herein, the data includes a single bit representing a binary response to the indication requesting feedback, or a set of bits representing a value in response to the indication requesting feedback, or a combination thereof.

In some examples of the method, apparatuses, and non-transitory computer-readable medium described herein, the one or more characteristics include at least one of an energy detected on at least one channel of the plurality of channels, a quantity of stations using at least one channel of the plurality of channels, a quantity of stations contending for access to at least one channel of the plurality of channels, a quantity of packets being communicated over at least one channel of the plurality of channels, or a quantity of packets.

Some examples of the method, apparatuses, and non-transitory computer-readable medium described herein may further include operations, features, means, or instructions for measuring one or more characteristics of a communication link based on receiving the indication, where selecting the network parameter may be based on measuring the one or more characteristics.

Some examples of the method, apparatuses, and non-transitory computer-readable medium described herein may further include operations, features, means, or instructions for selecting a channel candidate from the list of channel candidates based on the receiving the indication, where the selected network parameter includes the selected channel candidate.

In some examples of the method, apparatuses, and non-transitory computer-readable medium described herein, the channel used for transmitting the one or more characteristics may be the channel candidate selected by the station.

In some examples of the method, apparatuses, and non-transitory computer-readable medium described herein, the indication includes a PCN field for each channel candidate of the list of channel candidates.

Some examples of the method, apparatuses, and non-transitory computer-readable medium described herein may further include operations, features, means, or instructions for selecting a frequency spectrum band candidate from the list of frequency spectrum band candidates based on the receiving the indication, where the selected network parameter may be the selected frequency spectrum band candidate.

Some examples of the method, apparatuses, and non-transitory computer-readable medium described herein may further include operations, features, means, or instructions for selecting a BSS candidate from the list of BSS candidates based on the receiving the indication, where the selected network parameter may be the selected BSS candidate.

Some examples of the method, apparatuses, and non-transitory computer-readable medium described herein may further include operations, features, means, or instructions for identifying the channel for transmitting the one or more characteristics based on information included in the request, or the indication, or both.

Some examples of the method, apparatuses, and non-transitory computer-readable medium described herein may further include operations, features, means, or instructions for identifying a plurality of channels associated with a set of responses to the indication requesting feedback based on information included in the request, where the channel on which the one or more characteristics may be transmitted includes one of the plurality of channels.

Some examples of the method, apparatuses, and non-transitory computer-readable medium described herein may further include operations, features, means, or instructions for selecting a spatial reuse parameter for a BSS based on the receiving the indication, where the selected network parameter may be the selected spatial reuse parameter.

In some examples of the method, apparatuses, and non-transitory computer-readable medium described herein, the spatial reuse parameter includes a level of interference detected from a neighbor, a type of a spatial reuse mechanism, a preamble detection threshold, an energy detection threshold, a mid-amble detect threshold, or a BSS operating channel width, or a combination thereof.

Some examples of the method, apparatuses, and non-transitory computer-readable medium described herein may further include operations, features, means, or instructions for selecting a transmit power level for a BSS based on the receiving the indication, where the selected network parameter includes the transmit power level.

Some examples of the method, apparatuses, and non-transitory computer-readable medium described herein may further include operations, features, means, or instructions for selecting a BSS color candidate from the list of BSS color candidates based on the receiving the indication, where the selected network parameter includes the selected BSS color candidate.

In some examples of the method, apparatuses, and non-transitory computer-readable medium described herein, the indication requesting feedback includes a request for a list radio access technologies accessible by the station, a request for a SINR for a certain channel, a request for a RSSI for the certain channel, a request for a number of corrupted frames received within a MPDU, a request to identify corrupted frames, a request for instantaneous interference levels for the certain channel, a request for a multicast rate selection, a request for a minimum contention window adjustment based on a number of collisions or retransmission experienced by the station, or an EDCA parameter adjustment based on a number of collisions or retransmission experienced by the set of stations, or a combination thereof.

In some examples of the method, apparatuses, and non-transitory computer-readable medium described herein, the indication may be a beacon frame; and where the request may be a feedback report poll trigger frame. In some implementations, the feedback report poll trigger frame may be a type or a variant of a null data packet (NDP) feedback report poll trigger frame (NFRP) Trigger frame.

In some examples of the method, apparatuses, and non-transitory computer-readable medium described herein, the indication includes a target beacon transmit time that indicates a duration between receiving the indication and receiving the request.

In some examples of the method, apparatuses, and non-transitory computer-readable medium described herein, the request includes a type of the feedback requested, a range of the indication requesting feedback, a class of stations to respond to the indication requesting feedback, or a combination thereof.

In some examples of the method, apparatuses, and non-transitory computer-readable medium described herein, the class of stations includes stations associated with the access point, stations not associated with the access point, stations associated with other access points, other access points, or a combination thereof.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example frame usable for communications between an access point (AP) and a number of stations (STAs).

FIG. 2B shows an example frame usable for communications between an AP and a number of STAs.

Like reference numbers and designations in the various drawings indicate like elements.

DETAILED DESCRIPTION

Figure 1:
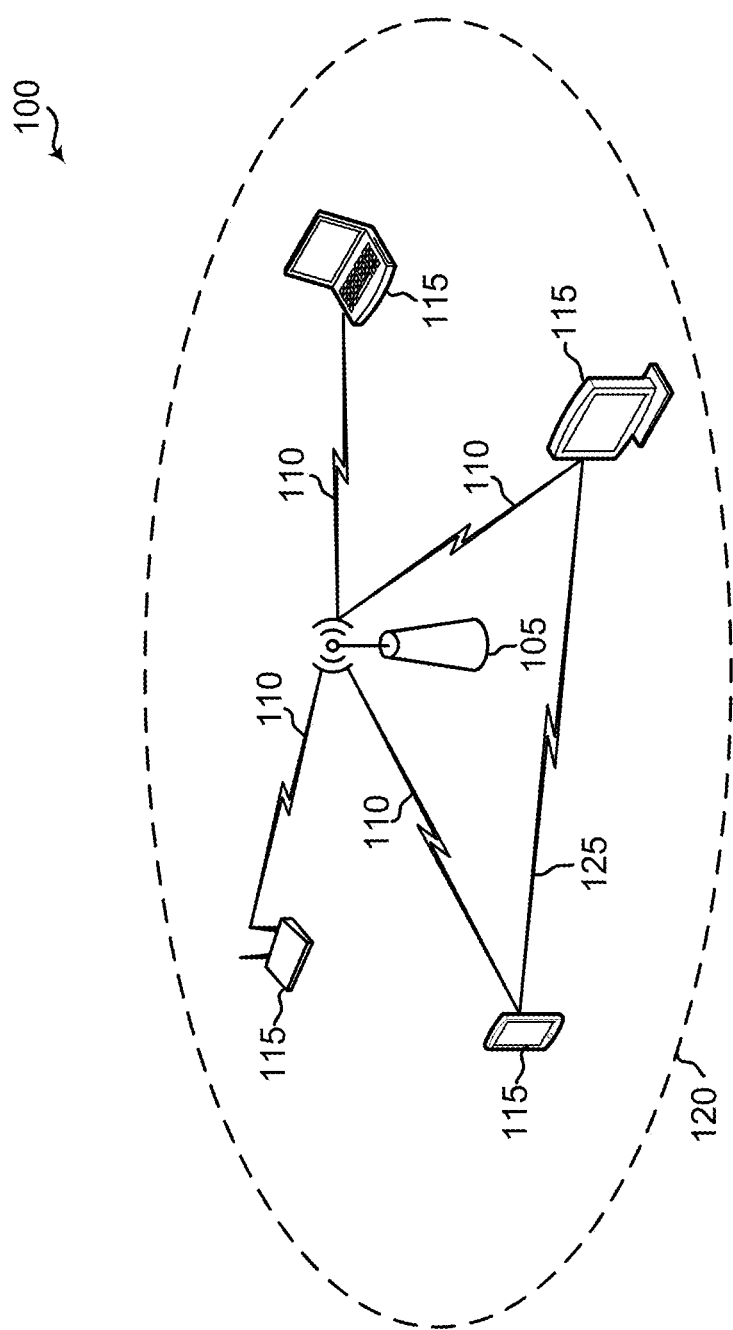
FIG. 1 illustrates an example of a wireless communication system that supports techniques for selecting network parameters based on feedback.

The following description is directed to certain implementations for the purposes of describing innovative aspects of this disclosure. However, a person having ordinary skill in the art will readily recognize that the teachings herein may be applied in a multitude of different ways. The described implementations may be implemented in any device, system or network that is capable of transmitting and receiving radio frequency (RF) signals according to any of the IEEE 802.11 standards, or the Bluetooth® standards. The described implementations also may be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In some wireless communications systems, an access point (AP) may act as a network coordinator and may obtain feedback information from multiple stations (STAs). The AP may make decisions about network parameters used by the network based on the feedback information. STAs may deliver reports with the feedback information. However, the transmission of feedback information via such reports may consume network resources and may reduce network performance. For example, in some existing systems, the AP may transmit a message to the STAs requesting feedback information on an individualized basis. In response to receiving the respective message, each STA may determine that the message is addressed to the STA, perform measurements consistent with the requested feedback, and provide the feedback information to the AP via a report transmitted in a separate message. As networks and wireless communications systems become more crowded with more STAs, networks may become congested with such individualized control signaling. For example, signaling related to cooperation-based algorithms designed to determine system and network parameters may increase as the number of STAs connected to the AP increases.

Various implementations relate generally to wireless communications. Some cases more specifically relate to techniques for selecting network parameters based on feedback in a wireless network. Techniques are described herein that enable an AP to select one or more network parameters based on feedback information collected from multiple STAs. In some implementations, the AP may transmit feedback requests to the STAs requesting information (or "feedback") from the STAs. For example, the AP may broadcast queries to the STAs requesting the feedback. The STAs may then respond with feedback based on the information requested in the broadcast queries. In some implementations, the AP may collect statistics about network parameters preferred by the STAs based on the information fed back from the STAs. The AP may select one or more network parameters for one or more STAs based at least in part on the information, for example, based on the collection of statistics. In some implementations, the AP may collect the statistics without identifying the individual STAs that are responding. In some implementations, the AP may gather responses using a two-message scheme. For example, a first message may inform the STAs about the feedback being requested and a second message may request that the STAs transmit the feedback to the AP. In such implementations, the STAs may have additional time (for example, the time difference between the second message and the first message) to gather statistics about the feedback that the AP plans to solicit with the second message.

FIG. 1 illustrates an example of a wireless communication system 100 that supports techniques for selecting network parameters based on feedback. According to some aspects, the wireless communications system 100 may be an example of a wireless local area network (WLAN) (and will hereinafter be referred to as WLAN 100). For example, the WLAN 100 may be a network implementing at least one of the IEEE 802.11 family of standards. The WLAN 100 may include numerous wireless devices such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN 100 may include multiple APs 105. An extended service set (ESS) may include a set of connected BSSs. An extended network station associated with the WLAN 100 may be connected to a wired or wireless distribution system that may enable multiple APs 105 to be connected in such an ESS. As such, a STA 115 may be covered by more than one AP 105 and may associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical (PHY) layer and medium access control (MAC) layer. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 6 GHz band, the 60 GHz band, the 3.6 GHz band, and the 900 MHz band. The unlicensed spectrum may also include other frequency bands, such as the emerging 6 GHz band. The wireless devices in the WLAN 100 also may be configured to communicate over other frequency bands such as shared licensed frequency bands, where multiple operators may have a license to operate in the same or overlapping frequency band or bands.

APs 105 may be configured to collect feedback information from the STAs 115 or other APs to use when selecting one or more network parameters. To collect feedback when selecting a network parameter, the AP 105 may transmit feedback requests to the STAs 115 requesting information (or "feedback") from the STAs 115. For example, the AP 105 may broadcast queries to the STAs requesting the feedback. The STAs 115 may then respond with feedback based on the information requested in the broadcast queries. in some implementations, the AP 105 may collect statistics about network parameters preferred by the STAs based on the information fed back from the STAs 115. The AP 105 may select one or more network parameters for one or more of the STAs 115 based at least in part on the information gathered from the STAs 115, for example, based on the collection of statistics. In some implementations, the AP 105 may gather responses using a two-message scheme. For example, a first message may inform the STAs 115 about the feedback being requested and a second message may request that the STAs 115 transmit the feedback to the AP 105.

In some implementations, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some implementations, ad hoc networks may be implemented within a larger wireless network such as the WLAN 100. In such implementations, while the STAs 115 may be capable of communicating with each other through the AP 105 using communication links 110, STAs 115 also may communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other P2P group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that enable devices to communicate without human intervention. For example, IoT, M2M or MTC may refer to communications from STAs 115 that integrate sensors or meters to measure or capture information and relay that information to a central server or application program that may make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape an overall antenna beam in the direction of a target receiver (for example, a STA 115), steer an overall antenna beam in the direction of a target receiver (for example, a STA 115), or do both. Beamforming may be achieved by combining elements in an antenna array in such a way that transmitted signals at particular angles experience constructive interference while others experience destructive interference. In some implementations, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some implementations, these weights may be determined before beamforming may be employed. For example, the transmitter (for example, the AP 105) may transmit one or more sounding packets to the receiver in order to determine CSI.

WLAN 100 may further support multiple-input, multiple-output (MIMO) wireless systems. Such systems may use a transmission scheme between a transmitter (for example, AP 105) and a receiver (for example, a STA 115), where both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN PDUs may be transmitted over a radio frequency spectrum band, which in some examples may include multiple sub-bands or frequency channels. In some implementations, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

In some wireless communications systems, such as WLAN 100, an AP 105 may act as a network coordinator and may obtain feedback information from STAs 115 individually. The AP 105 may make decisions about network parameters being used by the network based on the feedback information. STAs 115 may deliver reports with the feedback information. Such signaling may include information elements that may be carried in management frames or control fields that are carried in data, control, or management frames. However, the transmission of feedback information via such frames may consume network resources and may reduce network performance. In some cases, the STAs 115 may transmit the reports without solicitation from the AP 105. In some cases, the STAs 115 may transmit the reports in response to queries received from the AP 105. For example, in some existing systems, the AP 105 may transmit a message to the STA 115 requesting feedback information on an individualized basis. In response to receiving the respective message, each STA 115 may determine that the message is addressed to the STA 115 and may measure the requested feedback and provide the feedback information. As networks and wireless communications systems become more crowded with more STAs 115, networks may become more congested with such control signaling. For example, signaling related to cooperation-based algorithms designed to determine system and network parameters may increase as the number of STAs 115 coupled with an AP 105 increases. In some implementations, the STA may need more time (for example, advanced notice from the AP of its intention to request a particular type of feedback) to gather reliable statistics related to the requested feedback.

FIG. 2A shows an example frame 200 usable for communications between an AP and each of a number of stations identified by the AP. For example, the frame 200 may be formatted as a very high throughput (VHT) frame in accordance with the IEEE 802.11ac amendment to the IEEE 802.11 set of standards. The frame 200 may include a legacy preamble portion 202 that includes an L-STF 204, an L-LTF 206, and a legacy signaling field (L-SIG) 208. The frame 200 further includes a non-legacy preamble portion that includes a first VHT signaling field (VHT-SIG-A) 210, a VHT short training field (VHT-STF) 212, a number of VHT long training fields (VHT-LTFs) 214 and a second VHT signaling field (VHT-SIG-B) 216. The frame 200 also may include a payload or data portion 218 after the preamble. The data portion 218 may include MAC protocol data units (MPDUs), for example, in the form of an aggregated MPDU (AMPDU).

The frame 200 may be transmitted over a radio frequency spectrum band, which may include a plurality of sub-bands. For example, the radio frequency spectrum band may have a bandwidth of 80 MHz, and each of the sub-bands may have a bandwidth of 20 MHz. When the radio frequency spectrum band includes a plurality of sub-bands, the L-STF, L-LTF, and L-SIG fields 204, 206 and 208, respectively, may be duplicated and transmitted in each of the plurality of sub-bands. The information in the VHT-SIG-A field 210 is also duplicated and transmitted in each sub-band.

The VHT-SIG-A field 210 may indicate to a station that the frame 200 is an IEEE 802.11ac frame. The VHT-SIG-A field 210 also may include VHT WLAN signaling information usable by stations other than the number of stations that are identified to receive downlink communications in the frame 200. The VHT-SIG-A field 210 also includes information usable by the identified number of stations to decode the VHT-SIG-B field 216. The VHT-SIG-B field 216 may include VHT WLAN signaling information usable by the number of stations identified to receive downlink communications in the frame 200. More specifically, the VHT-SIG-B field 216 may include information usable by the number of stations to decode data received in the data portion 218. The VHT-SIG-B field 216 may be encoded separately from the VHT-SIG-A field 210. The number of VHT-LTFs 214 depends on the number of transmitted streams.

The frame 200 may be configured to include query information or poll trigger information as part of collecting feedback information to select one or more network parameters. In some implementations, the frame 200 may be used as an indication (for example, indication 630 described herein with reference to FIG. 6). In some implementations, the frame 200 may be used as a request (for example, request 655). In some implementations, the frame 200 may be used as a response (for example, response 665 described herein with reference to FIG. 6).

FIG. 2B shows an example frame 220 usable for communications between an AP and each of a number of stations identified by the AP. For example, the frame 220 may be formatted as a high efficiency (HE) frame in accordance with the IEEE 802.11ax amendment to the IEEE 802.11 set of standards. The frame 220 includes a legacy preamble portion 222 that includes an L-STF 224, an L-LTF 226, and an L-SIG 228. The frame 220 may further include a non-legacy preamble portion that may include a repeated legacy signaling field (RL-SIG) 230, a first high efficiency signaling field (HE-SIG-A) 232, a second high efficiency signaling field (HE-SIG-B) 234, a high efficiency short training field (HE-STF) 236 and a number of high efficiency long training fields (HE-LTFs) 238. The frame 220 also may include a payload or data portion 240 after the preamble. The data portion 240 may include MPDUs, for example, in the form of an AMPDU.

The frame 220 may be transmitted over a radio frequency spectrum band, which may include a plurality of sub-bands. For example, the radio frequency spectrum band may have a bandwidth of 80 MHz, and each of the sub-bands may have a bandwidth of 20 MHz. When the radio frequency spectrum band includes a plurality of sub-bands, the L-STF, L-LTF, and L-SIG fields 224, 226 and 228, respectively, may be duplicated and transmitted in each of the plurality of sub-bands. The information in the RL-SIG field 230 and the HE-SIG-A field 232 is also duplicated and transmitted in each sub-band as shown in FIG. 2B.

The RL-SIG field 230 may indicate to a station that the frame 220 is an IEEE 802.11ax frame. The HE-SIG-A field 232 may include high efficiency WLAN signaling information usable by stations other than the number of stations that are identified to receive downlink communications in the frame 220. The HE-SIG-A field 232 may also include information usable by the identified number of stations to decode the HE-SIG-B field 234. The HE-SIG-B field 234 may include high efficiency WLAN signaling information usable by the number of stations identified to receive downlink communications in the frame 220. More specifically, the HE-SIG-B field 234 may include information usable by the number of stations to decode data received in the data portion 240. The HE-SIG-B field 234 may be encoded separately from the HE-SIG-A field 232.

HE WLAN (HEW) preambles may be used to schedule multiple devices, such as STAs 115, for multi-user simultaneous transmissions (for example, using multi-user orthogonal frequency division multiple access (MU-OFDMA) or multi-user multiple-input, multiple-output (MU-MIMO) techniques). A HEW signaling field may be used to signal a resource allocation pattern to multiple receiving STAs 115. The HEW signaling field may include a common user field that is decodable by multiple STAs 115, as well as a resource allocation field. The resource allocation field may indicate resource unit distributions to multiple STAs 115 and indicate which resource units in a resource unit distribution correspond to MU-MIMO transmissions and which resource units correspond to OFDMA transmissions. The HEW signaling field also may include, subsequent to the common user field, dedicated station-specific signaling fields that are assigned to particular STAs 115 and used to schedule resources and to indicate the scheduling to other WLAN devices.

In some implementations, aspects of transmissions may vary based on a distance between a transmitter (for example, AP 105) and a receiver (for example, STA 115). WLAN 100 may otherwise generally benefit from AP 105 having information regarding the location of the various STAs 115 within coverage area 120. In some examples, relevant distances may be computed using round-trip time (RTT)-based ranging procedures. As an example, WLAN 100 may offer such functionality that produces accuracy on the order of one meter (or even centimeter-level accuracy). The same (or similar) techniques employed in WLAN 100 may be applied across other radio access technologies (RATs). For example, such RTT-based ranging functionality may be employed in developing "relative geofencing" applications (in other words, applications where there is a geofence relative to an object of interest such as a mobile device, a car, a person, etc.). Various such examples are considered according to some implementations. For example, car keys may employ RTT estimation for PKES systems. RTT-based geofences around an adult may monitor the position of a child within the geofence. Additionally, drone-to-drone and car-to-car RTT functionality may help prevent collisions.

The frame 220 may be configured to include query information or poll trigger information as part collecting feedback information to select one or more network parameters. In some implementations, the frame 220 may be used as an indication (for example, indication 630 described herein with reference to FIG. 6). In some implementations, the frame 220 may be used as a request (for example, request 655). In some implementations, the frame 220 may be used as a response (for example, response 665 described herein with reference to FIG. 6).

Figure 3:
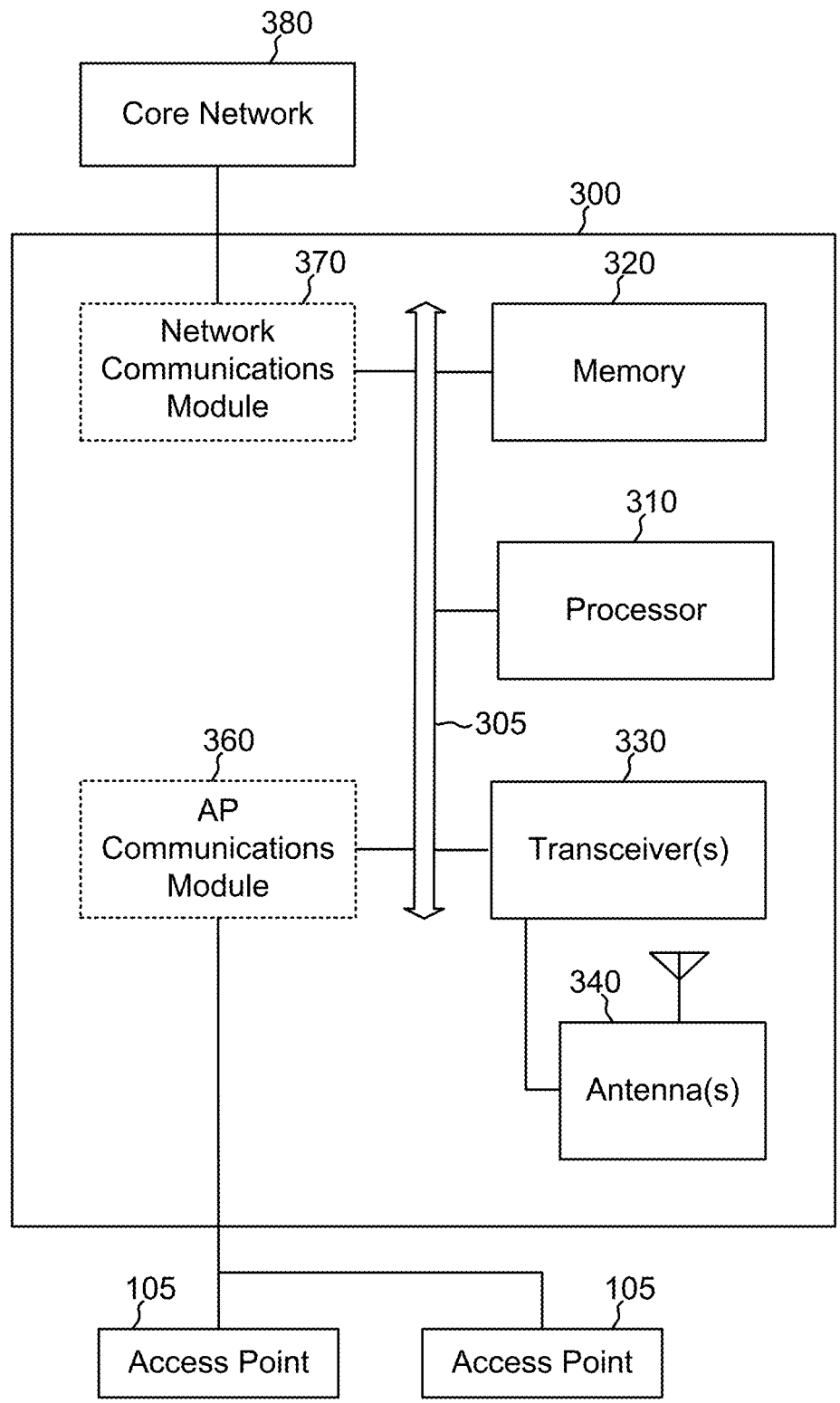
FIG. 3 shows a block diagram of an example AP for use in wireless communication.

FIG. 3 shows a block diagram of an example AP 300 for use in wireless communication. For example, the AP 300 may be an example of aspects of the AP 105 described with reference to FIG. 1. The AP 300 may be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 300 includes a processor 310, a memory 320, at least one transceiver 330 and at least one antenna 340. In some implementations, the AP 300 also includes one or both of an AP communications module 360 and a network communications module 370. Each of the components (or "modules") described with reference to FIG. 3 may communicate with one another, directly or indirectly, over at least one bus 305.

The memory 320 may include random access memory (RAM) and read-only memory (ROM). The memory 320 also may store processor- or computer-executable software (SW) code 325 containing instructions that, when executed by the processor 310, cause the processor to perform various functions described herein for wireless communication, including generation and transmission of a downlink frame and reception of an uplink frame.

The processor 310 may include an intelligent hardware device such as, for example, a central processing unit (CPU), a microcontroller, an application-specific integrated circuit (ASIC), or a programmable logic device (PLD) such as an FPGA, among other possibilities. The processor 310 processes information received through the transceiver 330, the AP communications module 360, and the network communications module 370. The processor 310 also may process information to be sent to the transceiver 330 for transmission through the antenna 340, information to be sent to the AP communications module 360, and information to be sent to the network communications module 370. The processor 310 may generally be configured to perform various operations related to generating and transmitting a downlink frame and receiving an uplink frame.

The transceiver 330 may include a modem to modulate packets and provide the modulated packets to the antenna 340 for transmission, as well as to demodulate packets received from the antenna 340. The transceiver 330 may be implemented as at least one RF transmitter and at least one separate RF receiver. The transceiver 330 may communicate bi-directionally, via the antenna 340, with at least one station 115 as, for example, shown in FIG. 1. Although only one transceiver 330 and one antenna 340 are shown in FIG. 3, the AP 300 may typically include multiple transceivers 330 and antennas 340. For example, in some AP implementations, the AP 300 may include multiple transmit antennas (each with a corresponding transmit chain) and multiple receive antennas (each with a corresponding receive chain). The AP 300 may communicate with a core network 380 through the network communications module 370. The system also may communicate with other APs, such as APs 105, using the AP communications module 360.

In some implementations, the AP 300 may be configured to select one or more network parameters based on the feedback information collected from STAs using voting techniques. The AP 300 may transmit an indication that includes one or more requests for feedback from the STAs. The AP 300 may subsequently transmit a request to the STAs that requests the STAs to respond by transmitting their feedback. The AP 300 may select one or more new network parameters based on the responses received from the STAs.

Figure 4:
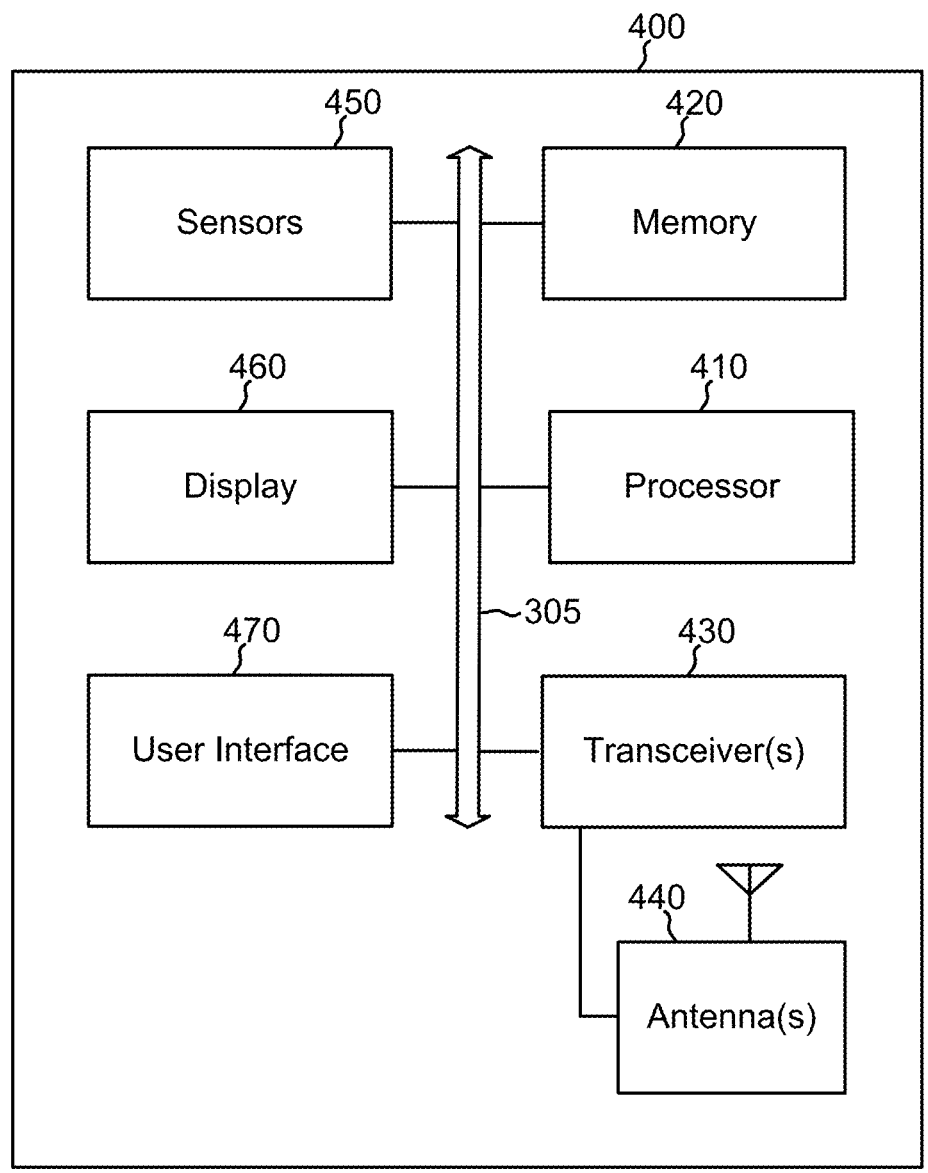
FIG. 4 shows a block diagram of an example STA for use in wireless communication.

FIG. 4 shows a block diagram of an example STA 400 for use in wireless communication. For example, the STA 400 may be an example of aspects of the STA 115 described with reference to FIG. 1. The STA 400 may be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 400 includes a processor 410, a memory 420, at least one transceiver 430 and at least one antenna 440. In some implementations, the STA 400 additionally includes one or more of sensors 450, a display 460 and a user interface (UI) 470 (such as a touchscreen or keypad). Each of the components (or "modules") described with reference to FIG. 4 may communicate with one another, directly or indirectly, over at least one bus 405.

The memory 420 may include RAM and ROM. The memory 420 also may store processor- or computer-executable SW code 425 containing instructions that, when executed, cause the processor 410 to perform various functions described herein for wireless communication, including reception of a downlink frame and generation and transmission of an uplink frame.

The processor 410 includes an intelligent hardware device such as, for example, a CPU, a microcontroller, an ASIC or a PLD such as an FPGA, among other possibilities. The processor 410 processes information received through the transceiver 430 as well as information to be sent to the transceiver 430 for transmission through the antenna 440. The processor 410 may be configured to perform various operations related to receiving a downlink frame and generating and transmitting an uplink frame.

The transceiver 430 may include a modem to modulate packets and provide the modulated packets to the antenna 440 for transmission, as well as to demodulate packets received from the antenna 440. The transceiver 430 may be implemented as at least one RF transmitter and at least one separate RF receiver. The transceiver 430 may communicate bi-directionally, via the antenna 440, with at least one AP 105 as, for example, shown in FIG. 1. Although only one transceiver 430 and one antenna 440 are shown in FIG. 4, the STA 400 may include two or more antennas. For example, in some STA implementations, the STA 400 may include multiple transmit antennas (each with a corresponding transmit chain) and multiple receive antennas (each with a corresponding receive chain).

In some implementations, the STA 400 may be configured to assist the AP in selecting one or more network parameters using voting techniques. The STA 400 may receive an indication from the AP that includes one or more requests for feedback. The STA 400 may measure characteristics and determine the feedback information requested by the AP. The STA 400 may later receive a request from the AP that asks the STA 400 to transmit the feedback that responds to the requests in the indication to the AP. The AP may select one or more new network parameters based on the responses received from the STA 400.

Figure 5:
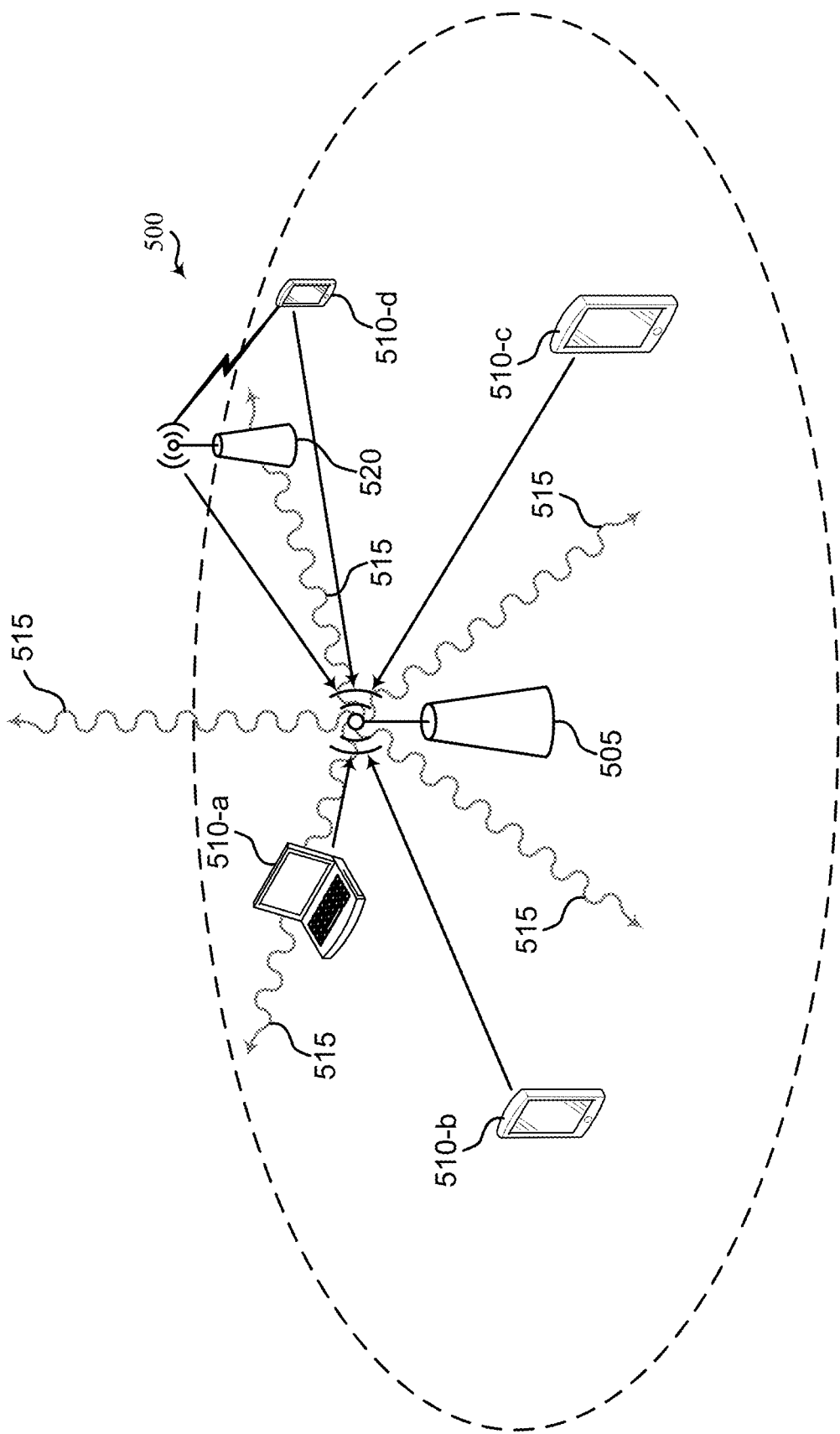
FIG. 5 shows a block diagram of a wireless communications system that supports techniques for selecting network parameters based on feedback according to some implementations.

FIG. 5 shows an example of a wireless communications system 500 that supports techniques for selecting network parameters based on feedback according to some implementations. In some examples, the wireless communications system 500 may implement aspects of wireless communications system 100. The wireless communications system 500 may illustrate techniques for selecting network parameters using feedback. Such techniques may include procedures performed by and communications exchanged between an AP 505 and a plurality of STAs 510. The AP 505 may be an example of the AP 105 and 300 described with reference to FIGS. 1 and 3. The STAs 510 may be examples of the STAs 115 and 400 described with reference to FIGS. 1 and 4.

Techniques are described herein for selecting network parameters based on feedback received from STAs 510 in a wireless network that may reduce network congestion. A voting mechanism may be implemented by the AP 505 to collect feedback information from the plurality of STAs 510. The voting mechanism may enable an AP 505 to advertise its intention of collecting feedback information using one or more messages 515 (e.g., indications) that include queries seeking information about the selection of network parameters to the plurality of STAs 510. In some implementations, the messages 515 may be received by STAs 510 associated with the AP 505, other APs 550, STAs 510 not associated with the AP 505 (for example, STA 510-*d* associated with the other AP 550), or a combination thereof. The AP 505 may also broadcast requests (also shown as 515) that request (or that trigger) the STAs 510 to transmit the information sought by the queries in the indications.

Any or all of the STAs 510 or the other APs 550 may communicate responses 555 to the AP 505 based on receiving such an indication and a request. The AP 505 may collect statistics about network parameters preferred or otherwise selected by the plurality of STAs 510. The AP 505 may select a network parameter based at least in part on collecting the statistics. In some implementations, the AP 505 may collect the statistics without identifying the individual STAs 510 that are responding. By broadcasting queries to a plurality of STAs 510 and gathering statistics about responses, the amount of network resources used for control signaling related to obtaining feedback information may be reduced. In some implementations, the AP 505 may gather responses using a two-message scheme, in which a first message informs the STAs 510 about the AP's intention to solicit feedback and, in some cases, the type of feedback being requested and a second message requests that the STAs 510 transmit the feedback to the AP 505. The STAs 510 may transmit the feedback in response to receiving the second message.

In some implementations, AP 505 may advertise in a beacon or broadcast a management frame that it will poll the STAs 510 to vote on the channel parameters based on channel conditions observed by the STAs 510 (for example, among all 8 channels of the 160 MHz BW of the BSS). STAs 510 may collect channel statistics or may determine one or more characteristics of channels and may determine that one or more of the channels is free. In some implementations, the AP 505 may send a trigger frame to the STAs 510, and the STAs 510 may vote on what the STAs 510 have determined. For example, STA 510 may indicate that a certain channel is free and the rest of the channels are busy. In some implementations, the feedback from the STA 510 may be sent in a physical (PHY) protocol data unit (PPDU) that does not include a data field (for example, high efficiency (HE) transport block (TB) null data packet (NDP) PPDU) that the STA 510 transmits in response to the AP's 505 trigger frame. In some implementations, the resource units (RUs) advertised in the trigger frame may not be addressed to STAs 510 but rather per parameter to a network parameter to be signaled. In some implementations, there may be a number (for example, 8) of RUs advertised in the trigger frame, and STAs 510 may generate the TB NDP PPDU and send energy or populate the RU tones of the RU that corresponds to a channel that is free, and may not send energy over an RU that corresponds to a channel that is not free, as observed by the STA 510. The AP 505 may identify a PPDU (for example, HE TB NDP PPDU) that contains the HE LTFs for certain RUs that have higher signal levels compared to the other RUs, which may mean more STAs 510 sent energy on this RU. The AP 505 may determine that the channel that is identified by this RU is a better candidate to be considered as free as compared to channels identified by other RUs. Energy may depend on the pathloss between the STAs 510 and the AP 505 and the AP 505 may request that the STAs 510 transmitting the HE NDP PPDU satisfy the target RSSI indicated in the trigger frame so that weights of the votes of each STA 510 may be similar. In certain other implementations, the AP 505 may instruct the STAs 510 to use multiplexing techniques (for example, in frequency, time, and space) to reduce a likelihood that the feedback provided by a STA 510 interferes significantly with that of another STA 510. For example, in certain cases the RU that the AP 505 assigns to the STAs 510 for transmitting the feedback may include multiple tones (for example, 26 tones allocated within 20 MHz and a 16 microsecond or 32 microsecond duration). In such cases, each STA 510 that transmits the NDP PPDU may transmit the LTF in a subset of the tones of the available one set (e.g., randomly select 1 tone from the available 26-tones) to indicate that the channel is idle.

Figure 6:
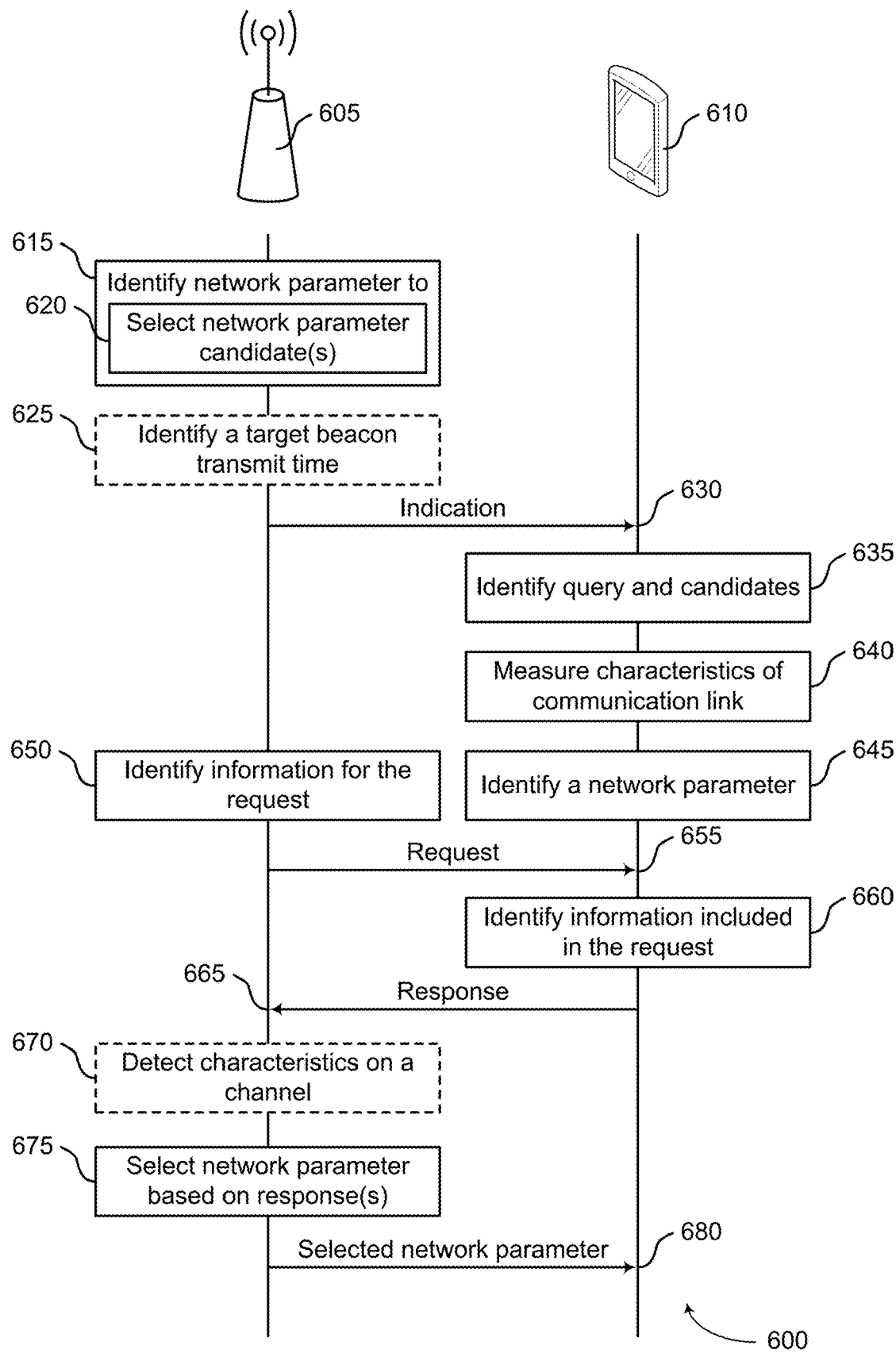
FIG. 6 shows an example of a communication procedure that supports techniques for selecting network parameters based on feedback according to some implementations.

FIG. 6 shows an example of a communication procedure 600 that supports techniques for selecting network parameters based on feedback according to some implementations. In some examples, the communication procedure 600 may implement aspects of wireless communications systems 100 and 500. The communication procedure 600 may illustrate techniques for selecting network parameters using feedback. The communication procedure 600 may include procedures performed by and communications exchanged between an AP 605 and a plurality of STAs 610. The AP 605 may be an example of the APs 105, 300 and 505 described with reference to FIGS. 1, 3 and 5. The STAs 610 may be examples of the STAs 115, 400 and 510 described with reference to FIGS. 1, 4 and 5.

At block 615, the AP 605 may identify one or more network parameters to potentially alter. As network conditions change, the AP 605 may find it desirable to alter the network parameters it is using. In some implementations, the AP 605 may employ voting techniques to gather feedback from a plurality of STAs 510 using fewer network resources. Examples of network parameters that may be altered by the AP 605 using voting techniques may include the primary channel used by the AP 605, a frequency spectrum band used by the AP 605 (such as for the primary channel), a BSS bandwidth, a spatial reuse parameter for a BSS, a transmit power control parameter for a BSS, BSS color selection, collision reporting, a list of radio access technologies accessible by a STA 510, or a combination thereof.

In some implementations, the AP 605 may identify a single query or a single request for feedback. In other implementations, the AP 605 may identify a plurality of queries for feedback. Each query or request may include a question about the selection of a network parameter.

The queries may include different types of questions. For example, some queries may invite feedback in the form of a binary response (for example, yes or no). Some queries may invite feedback in the form of a plurality of binary responses. Some queries may invite feedback in the form of a range of values (for example, range of 0 to N values). In some implementations, the range of values may be divided into discrete candidates. Examples of queries that seek responses within a range may include queries that ask what value for a network parameter is preferred out of a list of candidate values. Some queries may invite feedback in the form of value or a measurement that is open-ended and is not constrained by discrete values. In some implementations, the requests may include a request for a signal-to-interference-plus-noise ratio (SINR) for a certain channel, a request for a received signal strength indication (RSSI) for the certain channel, a request for a number of corrupted frames received within a MPDU, a request to identify corrupted frames, a request for instantaneous interference levels for the certain channel, a request for a multicast rate selection, a request for a minimum contention window adjustment based on a number of collisions or retransmission experienced by the plurality of stations, or an EDCA parameter adjustment based on a number of collisions or retransmission experienced by the set of stations, or a combination thereof.

At block 620, the AP 605 may select one or more network parameter candidates or response candidates based on which network parameter is being considered to be altered. Examples of types of queries that may include a list of discrete candidates may include selecting a new primary channel to be used by the AP 605, selecting a new frequency spectrum band, selecting a new BSS bandwidth, other inquiries, or a combination thereof. For instance, the AP 605 may identify a list of channel candidates that may be selected as the new primary channel and communicate that list of channel candidates to the STAs 610 in the indication 630 as part of a query. In some implementations, a query may not include a list of candidates.

At block 625, the AP 605 may identify a target beacon transmit time (TBTT) at which the AP 605 may decide to transmit the newly selected network parameters. The TBTT may be configured to give the STAs 610 notice about when to change parameters or when to complete its selection of a preferred network parameter. In some implementations, at the TBTT, the AP 605 may provide updated parameters to the STAs 610. In some implementations, at the TBTT, the AP 605 may broadcast a request 655.

The AP 605 may broadcast an indication 630 that includes one or more queries for feedback information from the STAs 610. The indication 630 may include a single query or it may include a plurality of queries. The indication 630 may include other information such as a TBTT or a time when the request 655 may be transmitted. In some implementations, the indication 630 may be an example of a beacon frame that includes information elements or other management frame. In some implementations, the indication 630 may be broadcast to a plurality of STAs 610 (additionally or alternatively, the indication 630 may be unicast or multicast to a subset the STAs 610). In some implementations, the indication 630 may be transmitted to neighboring APs (for example, AP 520) or to overlapping BSS STAs 610. The AP 605 may communicate the indication 630 for one or more beacon intervals prior to requesting that the STAs 610 transmit the feedback information. This way, the query for feedback may be received by as many STAs 610 as possible. The indication 630 may include a plurality of information elements. The information elements may include information about the one or more queries for feedback, lists of candidates related to the one or more queries for feedback, the type of the one or more queries for feedback, the range of the one or more queries for feedback, whether the one or more queries for feedback are limited to certain types of entities (for example, STAs associated with the AP, STAs not associated with the AP, STAs not associated with the AP but associated with a neighboring AP, neighboring APs), or a combination thereof.

At block 635, the STA 610 (or neighboring AP, as the case may be), may identify the one or more queries included in the indication 630. The STA 610 may also identify candidates related to the one or more queries for feedback in the indication 630.

At block 640, the STA 610 (or neighboring AP, as the case may be), may measure one or more characteristics of a communication link based on receiving the indication. For example, the STA 610 may identify the feedback information requested by the indication and make the measurements related to obtaining that feedback. In some implementations, the feedback information reported to the AP 605 may include the measured information. In some implementations, the STA 610 may make one or more determinations based on measurements.

At block 645, the STA 610 (or neighboring AP, as the case may be), may identify a preferred network parameter based on the measured characteristics. For example, the AP 605 may request feedback information about potentially changing the current primary channel to a new channel. In such instances, the indication 630 may indicate one or more channel candidates to serve as the primary channel. The STA 610 may measure one or more characteristics of each of the channel candidates (for example, RSSI) and identify a channel from the channel candidates as its preferred channel for the new primary channel based on measuring the characteristics.

At block 650, the AP 605 may identify information for the request 655. For example, the AP 605 identify information related to the type of query, the range of the query, and, in some implementations, an indication whether the query is limited to a subset of network entities. In some implementations, the AP 605 may perform these functions concurrently while the STA 610 is gathering information and making determinations based on query included in the indication 630.

The AP 605 may transmit the request 655 to the plurality of STAs 610. The request 655 may solicit the STAs 610 for the results of the query included in the indication 630. The request 655 may be configured to trigger the STAs 610 to transmit to the AP 605 the feedback information requested in the indication 630. The request 655 may be an example of a beacon frame. In some examples, the request 655 may be an example of null data packet (NDP) feedback report poll (NFRP) trigger frame. The request 655 may contain one or more fields that identify the type of query, the range of the query, and, in some implementations, an indication whether the query is limited to a subset of network entities. For example, the request 655 may include one or more fields or information elements that specify that a subset of entities are to transmit the feedback information to the AP 605. Examples of the subsets of entities that may be specified in the request 655 may include: STAs 610 that are associated to the AP 605, STAs 610 that are not associated to the AP 605, STAs 610 that are not associated with the AP 605 but are associated to other APs (for example, AP 520), STAs 610 that are associated with other APs (for example, AP 520), other APs (for example, AP 520), or a combination thereof. In some implementations, a set of STAs 610 may receive the indication 630 and determine feedback information, but a subset of the set of STAs 610 may be requested to transmit that feedback information to the AP 605. In such implementations, not all of the set of STAs 610 may transmit their feedback information to the AP 605. The request 655 may specify which network entities or which types of network entities are requested to transmit the feedback information. In some implementations, the subsets of entities that may be specified in the request 655 may include one or more of stations associated with the access point, stations intending to associate with the access point, other access points that are within transmission range of the access point, stations associated to other access points that are within transmission range of the access point. In some implementations, the indication 630 or the request 655 includes an identification of stations that are permitted to provide feedback.

The request 655 may also specify the types of responses that are requested in response to the queries for feedback information included in the indication 630. For example, the request 655 may indicate for each query in the indication 630 whether a response is: a single binary response (for example, yes or no) to the query, a plurality of binary responses to the query, a single response selected from a range of possible values (for example, selection of a preferred candidate), a plurality of responses selected from a range of possible values (for example, selection of a plurality of preferred candidates), numeric values (for example, measurement data), or a plurality of numeric values, or a combination thereof. In some implementations, the request 655 may specify or allocate communication resources to be used by the STA 610 to transmit the response 665. In some implementations, the request 655 may include coordinates of a matrix which specify the communication resources allocated for the response 665.

At block 660, the STA 610 (or neighboring AP, as the case may be), may identify information included in the request 655. In some implementations, the STA 610 may determine whether the request 655 applies to the STA 610. If so, the STA 610 may communicate a response 665 in response to receiving the request 655. In some implementations, the STA 610 may transmit a message to the AP 605 that includes the requested feedback information specified in the indication 630 or in the request 655 or both.

In some implementations, the STA 610 may transmit on a channel as the response 665. The response 665 may exhibit one or more characteristics, which may indicate a specific UE's preferred network parameter. The response 665 may not be modulated to include information. In such implementations, the AP 605 may be configured to identify feedback information from the plurality of STAs 610 based on the one or more characteristics of a specific channel. Hence, in some implementations, at block 670, the AP 605 may determine one or more characteristics of one or more channels. The more STAs 610 that transmit over a specific channel to cause certain characteristics to occur. In some cases, the one or more characteristics may include at least one of energy transmitted on at least one channel of the plurality of channels, a quantity of stations using at least one channel of the plurality of channels, a quantity of stations contending for access to at least one channel of the plurality of channels, a quantity of packets being communicated over at least one channel of the plurality of channels, a quantity of packets using low cyclic shifts on at least one channel of the plurality of channels, or a quantity of packets using high cyclic shifts on at least one channel of the plurality of channels. Features related to using the one or more characteristics as the response 665 are described in more detail with reference to FIG. 7. In some implementations, the plurality of channels are examples of a network or may be referred to as a network.

In some implementations, the response 665 may be used to collect feedback about which channel may serve as a new primary channel of the AP 605. The AP 605 may indicate channel candidates to serve as a new primary channel for the AP 605 in an indication 630. The STAs 610 may measure conditions of the channel candidates and select a preferred channel candidate. To communicate the response 665, the STA 610 may place one or more characteristics on the preferred channel candidate during a time resources specified by the request 655. The AP 605 may determine the one or more characteristics of each of the channel candidates at the time resource. The AP 605 may compare the different one or more characteristics on the channel candidates and determine a new primary channel based on that comparison. In some implementations, the STA 610 may be configured to put one or more characteristics on multiple channels indicating multiple preferred parameters or a ranked list of preferred parameters.

In some examples, the one or more characteristics may be energy. For example, in a ranked list, the STA 610 may place a high amount of energy on a first channel to indicate a most preferred parameter, an intermediate amount of energy on a second channel to indicate a second preferred parameter, a low amount of energy on a third channel to indicate a third preferred parameter, or no energy on any number of channels to indicate a parameter that is not preferred, or a combination thereof. In the previous example, the energy may also be a certain one or more characteristics that indicate preferred parameters in a ranked list. While a specific example of ranked list that includes three preferred parameters is described, the STA 610 may select any number of parameters and may allocate one or more characteristics to different channels in any manner to indicate those preferences.

In some implementations, the AP 605 may map a plurality of responses of a query to a plurality of channels. To respond to the query, the STAs 610 may place one or more characteristics on the channel that maps to the preferred parameter. The mapping between channels and responses may be included in the indication 630 or in the request 655.

In some implementations, the response 665 may be a message that includes modulated symbols that represent digital data. For example, the response 665 may include a single bit indicating a binary response to a query. In other examples, the response 665 may include a plurality of bits indicating a more complex response to a query. In some examples, the response 665 may include feedback information for multiple queries.

At block 675, the AP 605 may select a network parameter based on the one or more responses 665 received from the one or more STAs 610 or other APs. In some implementations, the AP 605 may compare responses 665 and may select the network parameter that is preferred by the most STAs 610. In some implementations, the AP 605 may apply complex rule-sets to selecting the network parameter. The AP 605 may communicate the selected network parameter 680 to the STAs 610 or other APs. In some implementations, the AP 605 may communicate the selected network parameter 680 at a time indicated by the TBTT.

Examples of procedures for selecting network parameter using feedback from STAs are described. The procedures for selecting the specific network parameters may implement features of the communication procedure 600.

In some implementations, the AP 605 may use the communication procedure 600 to select a new primary channel. In such implementations, the AP 605 may provide a list of channel candidates as part of the indication 630. The list of channel candidates may be part of the query for which STAs 610 will be asked to vote for during the polling period. Each STA 610 may scan each channel of the channel candidates and determine which of the channel candidates the STA 610 would prefer the AP 605 to use after the query is complete. In some instances, the AP 605 may also indicate the TBTT at which the switch/change will occur. In some instances, the indication 630 may include a query field that includes one or more primary channel number (PCN) subfields (one for each candidate PCN). The AP 605 may query for as many PCNs as it finds suitable.

In some implementations, the AP 605 may use the communication procedure 600 to select frequency spectrum band for some communications (for example, a frequency spectrum band for the primary channel). The indication 630 may include one or more subfields or information elements to indicate the frequency spectrum band candidates that are part of the query. Examples of frequency spectrum bands that may be included in a query may include sub-1 GHz, 2.4 GHz, 5 GHz, 6 GHz, or 60 GHz, or a combination thereof.

In some implementations, the AP 605 may use the communication procedure 600 to select BSS bandwidth for some communications (for example, BSS bandwidth for the primary channel). The indication 630 may include one or more subfields or information elements to indicate the BSS bandwidth candidates that are part of the query. Examples of BSS bandwidths that may be included in a query may include 20 MHz, 40 MHz, 80 MHz, 160 MHz, or 320 MHz, or a combination thereof.

In some implementations, the AP 605 may use the communication procedure 600 to select a spatial reuse parameter, which may enable spatial reuse for a BSS. In such implementations, the AP 605 may query the STAs 610 for levels of interference from their neighboring entities, the type of spatial reuse mechanism the STAs 610 would prefer, or other related parameters (for example, a preamble detect (PD) threshold, an energy detect (ED) threshold, a midamble detect (MD) threshold, etc.). In some implementations, the STAs 610 may identify a parameter for each of the 20 MHz subchannels they are operating in up to either their operating channel width (for example, 80 MHz if the STA 610 is 80 MHz device) or the BSS operating channel width (for example, up to 160 MHz even if the STA 610 is an 80 MHz device, where in the latter implementation the STA 610 would scan the other 80 MHz channel).

In some implementations, the AP 605 may use the communication procedure 600 to select a transmit power control parameter. In such implementations, the AP 605 may enable transmit power control for the BSS. The AP 605 may query the STAs 610 for a minimum transmit power, a maximum transmit power, or both for which the STAs 610 would prefer while operating in the BSS.

In some implementations, the AP 605 may use the communication procedure 600 to select a BSS color. In some implementations, the AP 605 may use the communication procedure 600 to select parameters related to collision reporting. In some wireless communication systems (for example, 11ax), the AP 605 may be configured to use a six-bit BSS color to indicate a BSS color. In some implementations, the BSS color selected by the AP 605 may be the same BSS color selected by a neighboring AP. Spatial reuse, NAV, and other features may be affected and system performance may be degraded when neighboring APs use the same BSS color. The AP 605 may query the STAs 610 when selecting the new BSS color. The query may ask for an open-ended suggestion for a new BSS color from the STAs 610 (for example, STAs indicate one or more BSS colors that are not detected). In some implementations, the AP 605 may identify a list of BSS color candidates and communicate those candidates to the STAs 610 in the indication 630.

In some implementations, the AP 605 may use the communication procedure 600 to detect the presence of other wireless technologies or other radio access technologies (for example, radar, Bluetooth, Zigbee, LAA, etc.). The AP 605 may query the STAs 610 for their capabilities. The AP 605 may use the information about other technologies to enable coexistence and reduce cross-technology interference.

In some implementations, the AP 605 may use the communication procedure 600 to identify SINR levels or RSSI levels for one or more channels. The STAs 610 may include data related to these levels in the response 665. The AP 605 may use this feedback information to allocate channels more efficiently.

In some implementations, the AP 605 may use the communication procedure 600 to select network parameters that may not include measuring long-term statistics to be gathered by the STAs 610. Examples of such network parameters may include how many corrupted frames are received from within the MPDU that contains the indication 630 or the request 655 or both, which frames are corrupted in the indication 630 or the request 655 or both (for example, a SN may be used to identify each of them), instantaneous interference levels per channel, multicast rate selection (based on SINR), activating a BSS-wide request-to-send (RTS) or a clear-to-send (CTS) based on a percentage of hidden conditions or exposed conditions, a dynamic CWmin adjustment based on a number of collisions or a number of retransmissions experienced by the STA 610, or a combination thereof.

Figure 7:
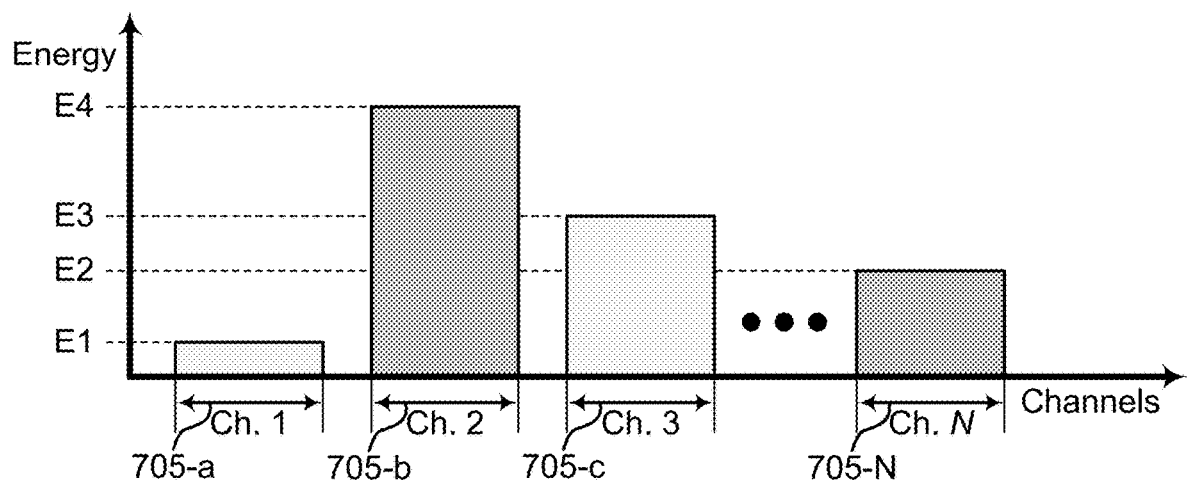
FIG. 7 shows an example of a diagram of energy detected on different channels that supports techniques for selecting network parameters based on feedback according to some implementations.

FIG. 7 shows an example of a diagram 700 of energy detected on different channels that supports techniques for selecting network parameters based on feedback according to some implementations. In some examples, the diagram 700 may implement aspects of wireless communications systems 100 and 500. The diagram 700 illustrates how the responses 665 described with reference to the communication procedure 600 of FIG. 6 may be detected by the AP 605. The diagram 700 illustrates a graph showing an amount of energy (y-axis) on a number of channels (x-axis). In some implementations, detecting energy levels, or energy patterns, or other channel statistics on different channels may be an example of determining one or more characteristics of the different channels. Other examples of characteristics of channels that may be used to indicate preferred network parameters may include at least one of energy transmitted on at least one channel of the plurality of channels, a quantity of stations using at least one channel of the plurality of channels, a quantity of stations contending for access to at least one channel of the plurality of channels, a quantity of packets being communicated over at least one channel of the plurality of channels, a quantity of packets using low cyclic shifts on at least one channel of the plurality of channels, or a quantity of packets using high cyclic shifts on at least one channel of the plurality of channels.

The diagram 700 shows a plurality of channels 705-*a*, 705-*b*, 705-*c*, and 705-N and the amount of energy on those channels (for example, E1, E2, E3, and E4). While only four channels are shown, any number of channels may be detected by the AP 605 as part of the communication procedure 600. The diagram 700 illustrates how using energy to indicate preferred network parameters may work.

In response to a query, one or more STAs 610 may be configured to transmit energy on one or more channels 705 that corresponds to the STAs' preferred network parameter(s). Once the STA 610 selects a preferred parameter, the STA 610 may identify a channel 705 associated with the preferred parameter and place energy on that channel. The AP 605, rather than collect individual responses from each STA 610, may measure the energy on the channels 705. The aggregate energy on each channel 705 may include contributions from a plurality of STAs 610. As such, the more amount of energy on channel 705, the larger number of STAs 610 that prefer a particular network parameter. For example, the network parameter associated with the second channel 705-*b* may be preferred by STAs 610 than any other channel.

In some examples, the channels 705 may correspond to channel candidates to serve a new primary channel for an AP 605. The STAs 610 may scan the channel candidates and add energy to the channel candidate that they prefer.

In some examples, the channels 705 may be mapped to parameter candidates for a different query. In such implementations, the AP 605 may provide the mapping to the STAs 610 and the STAs 610 may add energy to the channel 705 that maps to their preferred network parameter.

Figure 8:
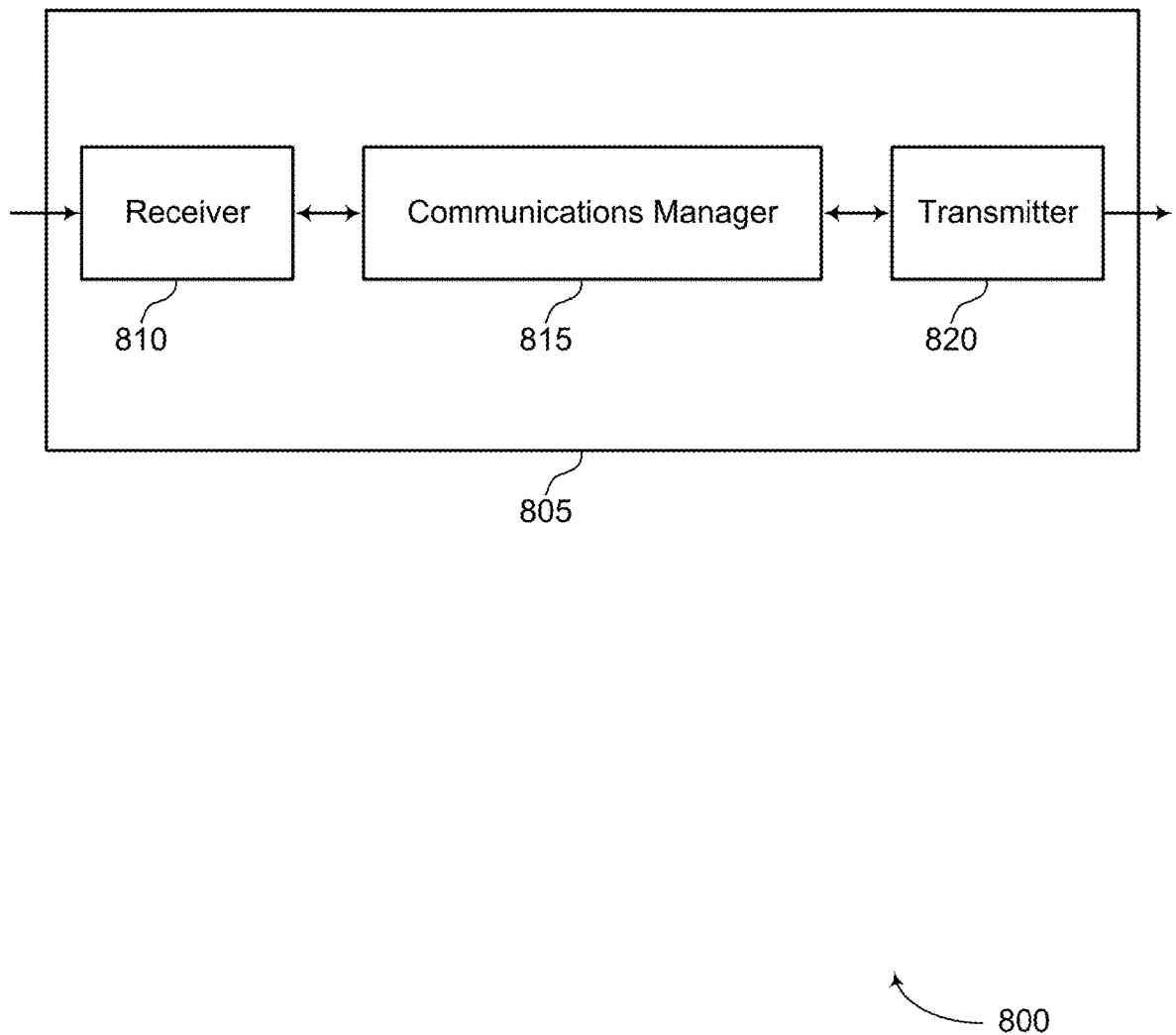
FIGS. 8 and 9 show block diagrams of devices that support techniques for selecting network parameters based on feedback according to some implementations.

FIG. 8 shows a block diagram 800 of a device 805 that supports techniques for selecting network parameters based on feedback according to some implementations. The device 805 may be an example of aspects of an AP as described herein. The device 805 may include a receiver 810, a communications manager 815, and a transmitter 820. The device 805 may also include a processor. Each of these components may be in communication with one another (for example, via one or more buses).

The receiver 810 may receive information such as packets, user data, or control information associated with various information channels (for example, control channels, data channels, and information related to techniques for selecting network parameters based on feedback, etc.). Information may be passed on to other components of the device. The receiver 810 may be an example of aspects of the transceiver 1120 described with reference to FIG. 11. The receiver 810 may utilize a single antenna or a set of antennas. The communications manager 815 may broadcast, to a set of stations, an indication requesting feedback about a selection of one or more network parameters, broadcast, to the set of stations, a request for transmission of the feedback identified in the indication, receive, from a plurality of stations, feedback based on the indication requesting feedback and the request for transmission of the feedback, detect energy, on a set of channels, indicating one or more preferred network parameters identified by the set of stations in response to broadcasting the request, and select a network parameter based on detecting the energy on the set of channels. In some implementations, the communications manager 815 may also determine one or more characteristics of a plurality of channels based on the feedback, the one or more characteristics indicating one or more network parameters identified by the plurality of stations in response to broadcasting the request, and select a network parameter based at least in part on determining the one or more characteristics of the plurality of channels. In some implementations, the one or more characteristics may be associated with or provide one or more network parameters identified by the plurality of stations in response to broadcasting the request. The communications manager 815 may be an example of aspects of the communications manager 1110 described herein.

The communications manager 815, or its sub-components, may be implemented in hardware, code (for example, software or firmware) executed by a processor, or any combination thereof. If implemented in code executed by a processor, the functions of the communications manager 815, or its sub-components may be executed by a general-purpose processor, a digital signal processor (DSP), an ASIC, a field programmable gate array (FPGA) or other programmable logic device, discrete gate or transistor logic, discrete hardware components, or any combination thereof designed to perform the functions described in the present disclosure.

The communications manager 815, or its sub-components, may be physically located at different locations, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
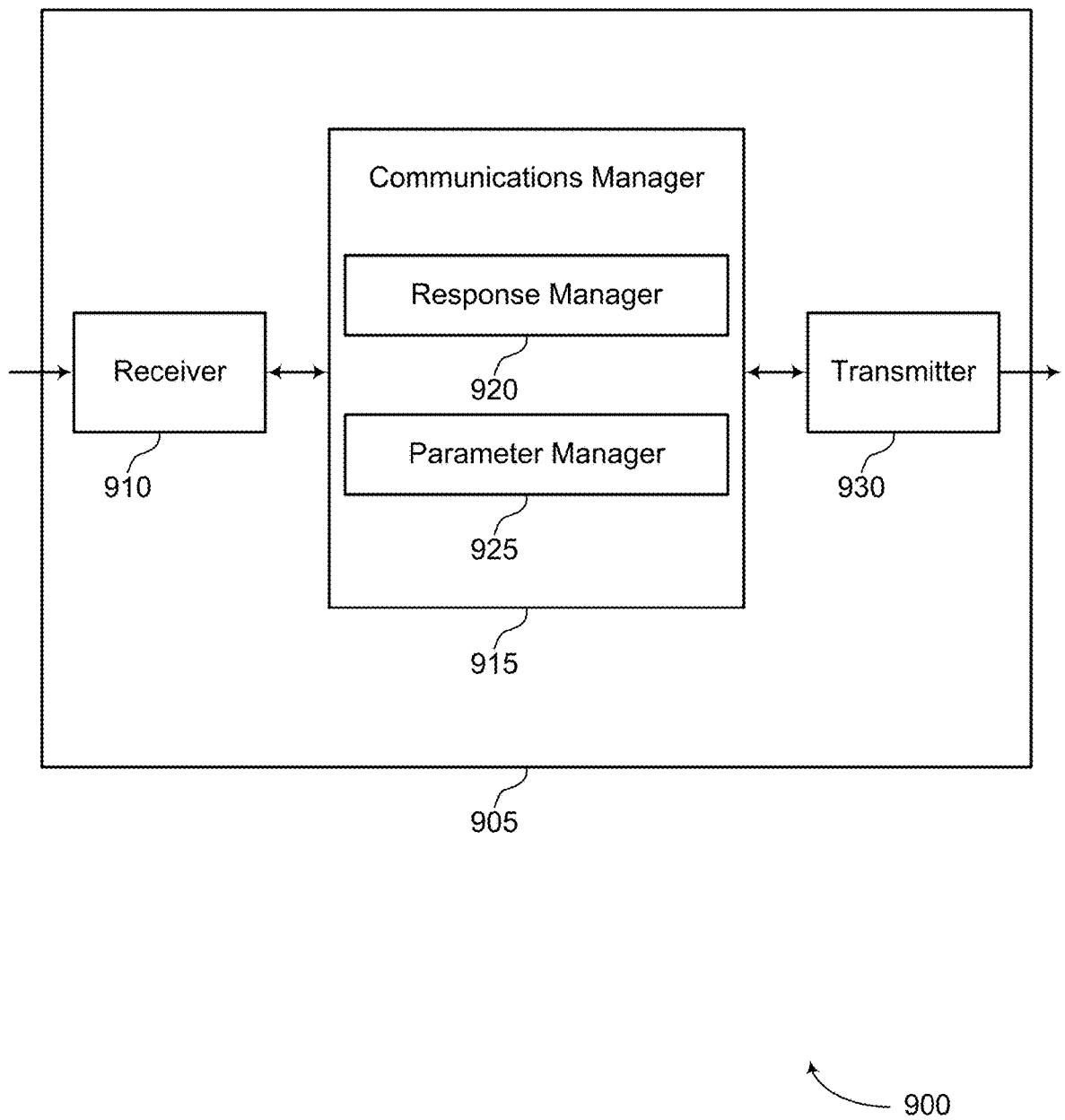

FIG. 9 shows a block diagram 900 of a device 905 that supports techniques for selecting network parameters based on feedback according to some implementations. The device 905 may be an example of aspects of a device 805 or an AP 105 as described herein. The device 905 may include a receiver 910, a communications manager 915, and a transmitter 935. The device 905 may also include a processor. Each of these components may be in communication with one another (for example, via one or more buses).

The receiver 910 may receive information such as packets, user data, or control information associated with various information channels (for example, control channels, data channels, and information related to techniques for selecting network parameters based on feedback, etc.). Information may be passed on to other components of the device. The receiver 910 may be an example of aspects of the transceiver 1120 described with reference to FIG. 11. The receiver 910 may utilize a single antenna or a set of antennas. In some implementations, the receiver 910 may receive, from a plurality of stations, feedback based on the indication requesting feedback and the request for transmission of the feedback.

The communications manager 915 may be an example of aspects of the communications manager 815 as described herein. The communications manager 915 may include a response manager 920 and a parameter manager 925. The communications manager 915 may be an example of aspects of the communications manager 1110 described herein.

The response manager 920 may detect energy, on a set of channels, indicating one or more preferred network parameters identified by the set of stations in response to broadcasting the request. In some implementations, the response manager 920 may also determine one or more characteristics of a plurality of channels based on the feedback, the one or more characteristics indicating one or more network parameters identified by the plurality of stations in response to broadcasting the request, and select a network parameter based on determining the one or more characteristics of the plurality of channels. In some implementations, the one or more characteristics may be associated with or provide one or more network parameters identified by the plurality of stations in response to broadcasting the request.

The parameter manager 925 may select a network parameter based on detecting the energy on the set of channels. In some implementations, the parameter manager 925 may select a network parameter based on determining the one or more characteristics of the plurality of channels.

The transmitter 930 may transmit signals generated by other components of the device. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas. The transmitter 930 may broadcast, to a set of stations, an indication requesting feedback about a selection of one or more network parameters and broadcast, to the set of stations, a request for transmission of the feedback identified in the indication.

Figure 10:
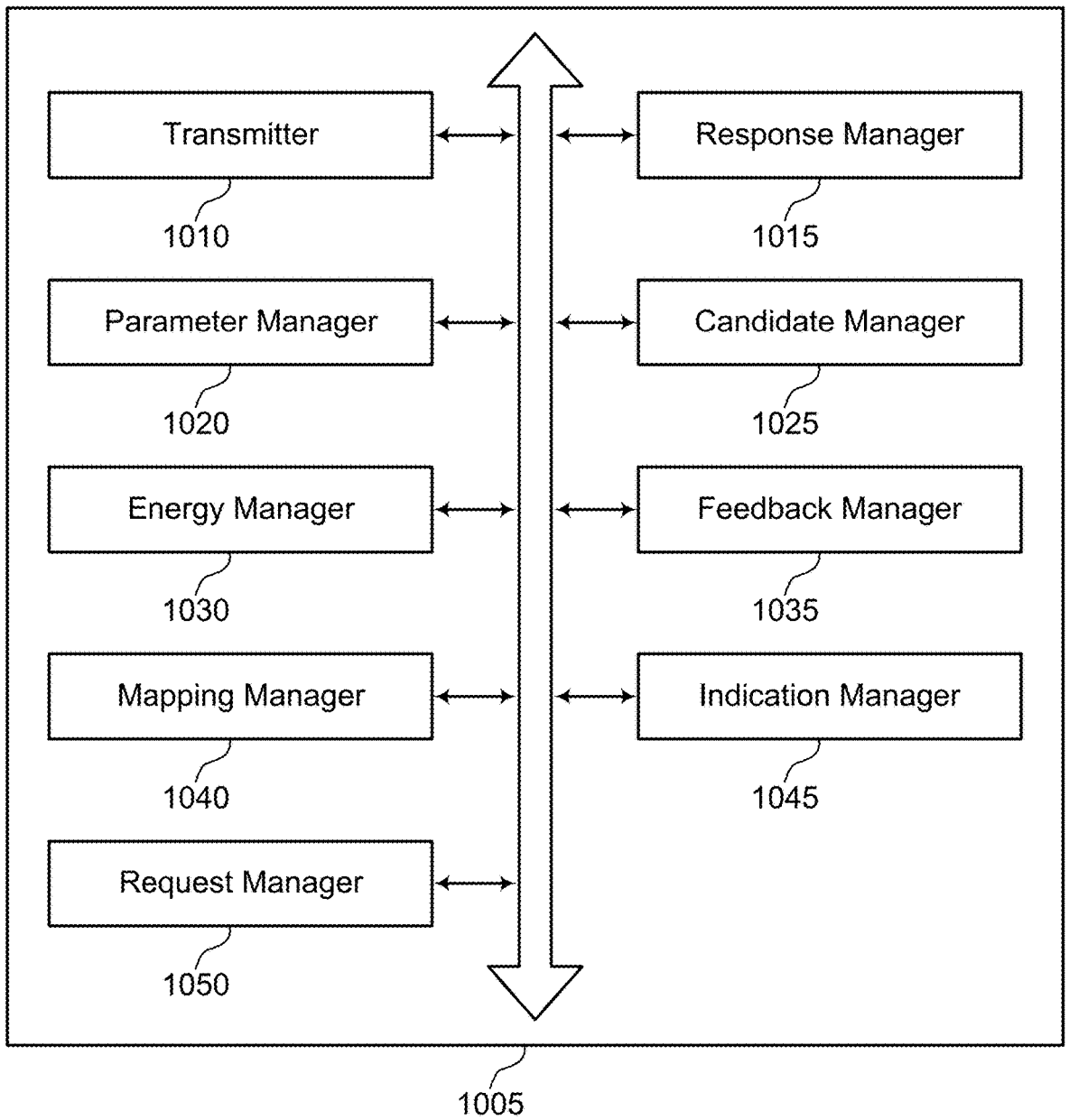
FIG. 10 shows a block diagram of a communications manager that supports techniques for selecting network parameters based on feedback according to some implementations.

FIG. 10 shows a block diagram 1000 of a communications manager 1005 that supports techniques for selecting network parameters based on feedback according to some implementations. The communications manager 1005 may be an example of aspects of a communications manager 815, a communications manager 915, or a communications manager 1110 described herein. The communications manager 1005 may include a transmitter 1010, a response manager 1015, a parameter manager 1020, a candidate manager 1025, an energy manager 1030, a feedback manager 1035, a mapping manager 1040, an indication manager 1045, and a request manager 1050. Each of these modules may communicate, directly or indirectly, with one another (for example, via one or more buses).

The transmitter 1010 may broadcast, to a set of stations, an indication requesting feedback about a selection of one or more network parameters. In some examples, the transmitter 1010 may broadcast, to the set of stations, a request for transmission of the feedback identified in the indication.

The response manager 1015 may detect energy, on a set of channels, indicating one or more preferred network parameters identified by the set of stations in response to broadcasting the request. In some implementations, the response manager 1015 may receive, from the plurality of stations, feedback based on the indication requesting feedback and the request for transmissions of the feedback. In some implementations, the response manager 1015 may determine one or more characteristics of a plurality of channels based on the feedback, the one or more characteristics indicating one or more network parameters identified in response to broadcasting the request. In some implementations, the one or more characteristics may be associated with or provide one or more network parameters identified by the plurality of stations in response to broadcasting the request. In some examples, the response manager 1015 may receive, by the access point, a response from at least one of the set of stations that includes data indicating the network parameters identified by the set of stations, the determination of the one or more characteristics being based at least in part on the data. In some implementations, the response includes a single bit representing a binary response to the indication requesting feedback, or a set of bits representing a value in response to the indication requesting feedback, or a combination thereof.

The parameter manager 1020 may select a network parameter based on detecting the energy on the set of channels. In some implementations, the parameter manager 1020 may select a network parameter based on determining the one or more characteristic of the plurality of channels. In some examples, the parameter manager 1020 may transmit the selected network parameter to the set of stations.

The candidate manager 1025 may select a list of channel candidates to serve as a primary channel for the access point, where the indication includes the list of channel candidates and the selected network parameter is one of the channel candidates. In some examples, the candidate manager 1025 may select a list of frequency spectrum band candidates associated with a primary channel for the access point, where the indication includes the list of frequency spectrum band candidates and the selected network parameter is one of the frequency spectrum band candidates. In some examples, the candidate manager 1025 may select a list of BSS candidates associated with a primary channel for the access point, where the indication includes the list of BSS candidates and the selected network parameter is one of the BSS candidates.

In some examples, the candidate manager 1025 may identify a spatial reuse parameter for a BSS, where the indication requesting feedback includes the spatial reuse parameter. In some examples, the candidate manager 1025 may identify a transmit power control parameter, where the indication requests a transmit power level for a BSS.

In some examples, the candidate manager 1025 may select a list of BSS color candidates, where the indication requesting feedback includes a list of BSS color candidates, where one of the selected BSS color candidates is the selected network parameter. In some implementations, each channel of the set of channels is a channel candidate from the list of channel candidates. In some implementations, the indication includes a PCN field for each channel candidate of the list of channel candidates. In some implementations, the network parameters included in the indication include a level of interference detected from a neighbor, a type of a spatial reuse mechanism, a preamble detection threshold, an energy detection threshold, a mid-amble detect threshold, or a BSS operating channel width, or a combination thereof.

The energy manager 1030 may compare the energy detected on a first channel to the energy detected on a second channel, where selecting the network parameter is based on a difference in the energy detected on the first channel and the energy detected on the second channel.

The feedback manager 1035 may identify the feedback received from the set of stations without identifying any of the set of stations, where selecting the network parameter is based on identifying the feedback. In some examples, the feedback manager 1035 may identify a target beacon transmit time for broadcasting the request, where the indication includes the target beacon transmit time. In some implementations, the target beacon transmit time indicates a duration between broadcasting the indication and broadcasting the request, or the target beacon transmit time indicates a counter of beacons between broadcasting the indication and broadcasting the request, or indicates a time at which the access point will modify the one or more network parameters identified in the indication.

The mapping manager 1040 may map a set of responses to the indication to the set of channels, where selecting the network parameter is based on the mapping of the set of response to the set of channels.

The indication manager 1045 may be associated with functions and contents of the indication. In some implementations, the indication requesting feedback includes a request for a list radio access technologies accessible by the set of stations, a request for a SINR for a certain channel, a request for a RSSI for the certain channel, a request for a number of corrupted frames received within a MPDU, a request to identify corrupted frames, a request for instantaneous interference levels for the certain channel, a request for a multicast rate selection, a request for a minimum contention window adjustment based on a number of collisions or retransmission experienced by the set of stations, or an enhanced distributed Coordination access (EDCA) parameter adjustment based on a number of collisions or retransmission experienced by the set of stations, or a combination thereof. In some implementations, the indication is included in a beacon frame, and where the request is included in a feedback report poll trigger frame.

The request manager 1050 may be associated with functions and contents of the request. In some implementations, the request includes a type of the feedback requested, a range of the indication requesting feedback, a class of stations to respond to the indication requesting feedback, or a combination thereof. In some implementations, the class of stations includes stations associated with the access point, stations not associated with the access point, stations associated with other access points, other access points, or a combination thereof. In some implementations, the plurality of stations or the class of stations includes one or more of stations associated with the access point, stations intending to associate with the access point, other access points that are within transmission range of the access point, stations associated to other access points that are within transmission range of the access point.

Figure 11:
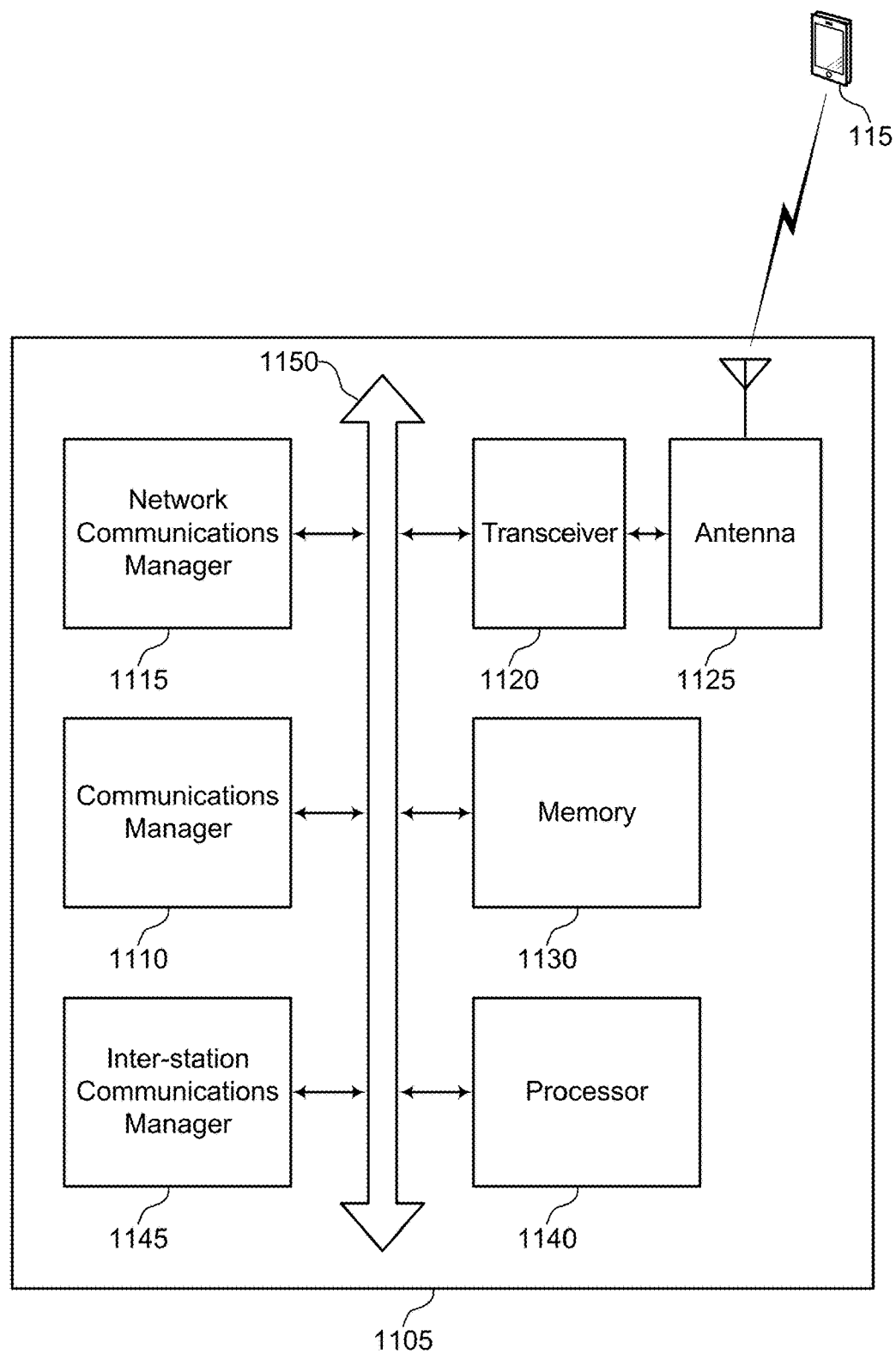
FIG. 11 shows a diagram of a system including a device that supports techniques for selecting network parameters based on feedback according to some implementations.

FIG. 11 shows a diagram of a system 1100 including a device 1105 that supports techniques for selecting network parameters based on feedback according to some implementations. The device 1105 may be an example of or include the components of device 805, device 905, or an AP as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (for example, bus 1150).

The communications manager 1110 may broadcast, to a set of stations, an indication requesting feedback about a selection of one or more network parameters, broadcast, to the set of stations, a request for transmission of the feedback identified in the indication, receive, from a plurality of stations, feedback based at least in part on the indication requesting feedback and the request from transmission of the feedback, detect energy, on a set of channels, indicating one or more preferred network parameters identified by the set of stations in response to broadcasting the request, and select a network parameter based on detecting the energy on the set of channels. In some implementations, the communication manager 1110 may determine one or more characteristics of a plurality of channels based on the feedback, the one or more characteristics indicating one or more network parameters identified by the plurality of stations in response to broadcast the request, and select a network based on determining the one or more characteristics of the plurality of channels. In some implementations, the one or more characteristics may be associated with or provide one or more network parameters identified by the plurality of stations in response to broadcasting the request. In some implementations, the communications manager 1110 may receive the feedback that may include detecting energy on at least one channel of the plurality of channels, the determination of the one or more characteristics being based at least in part on the detected energy, the detected energy indicating the one or more network parameters identified by the plurality of station in response to broadcasting the request.

The network communications manager 1115 may manage communications with the core network (for example, via one or more wired backhaul links). For example, the network communications manager 1115 may manage the transfer of data communications for client devices, such as one or more STAs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some implementations, the wireless device may include a single antenna 1125. However, in some implementations the device may have more than one antenna 1125, which may be capable of concurrently transmitting or receiving multiple wireless transmissions.

The memory 1130 may include RAM and ROM. The memory 1130 may store computer-readable, computer-executable code 11 35 including instructions that, when executed, cause the processor to perform various functions described herein. In some implementations, the memory 1130 may contain, among other things, a basic input/output system (BIOS) which may control basic hardware or software operation such as the interaction with peripheral components or devices.

The processor 1140 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1140 may be configured to operate a memory array using a memory controller. In other implementations, a memory controller may be integrated into processor 1140. The processor 1140 may be configured to execute computer-readable instructions stored in a memory to perform various functions (for example, functions or tasks supporting techniques for selecting network parameters based on feedback).

The inter-station communications manager 1145 may manage communications with other AP 105, and may include a controller or scheduler for controlling communications with STAs 115 in cooperation with other APs 105. For example, the inter-station communications manager 1145 may coordinate scheduling for transmissions to STAs 115 for various interference mitigation techniques such as beamforming or joint transmission. In some examples, the inter-station communications manager 1145 may provide an X2 interface within an LTE/LTE-A wireless communication network technology to provide communication between APs 105.

Figure 12:
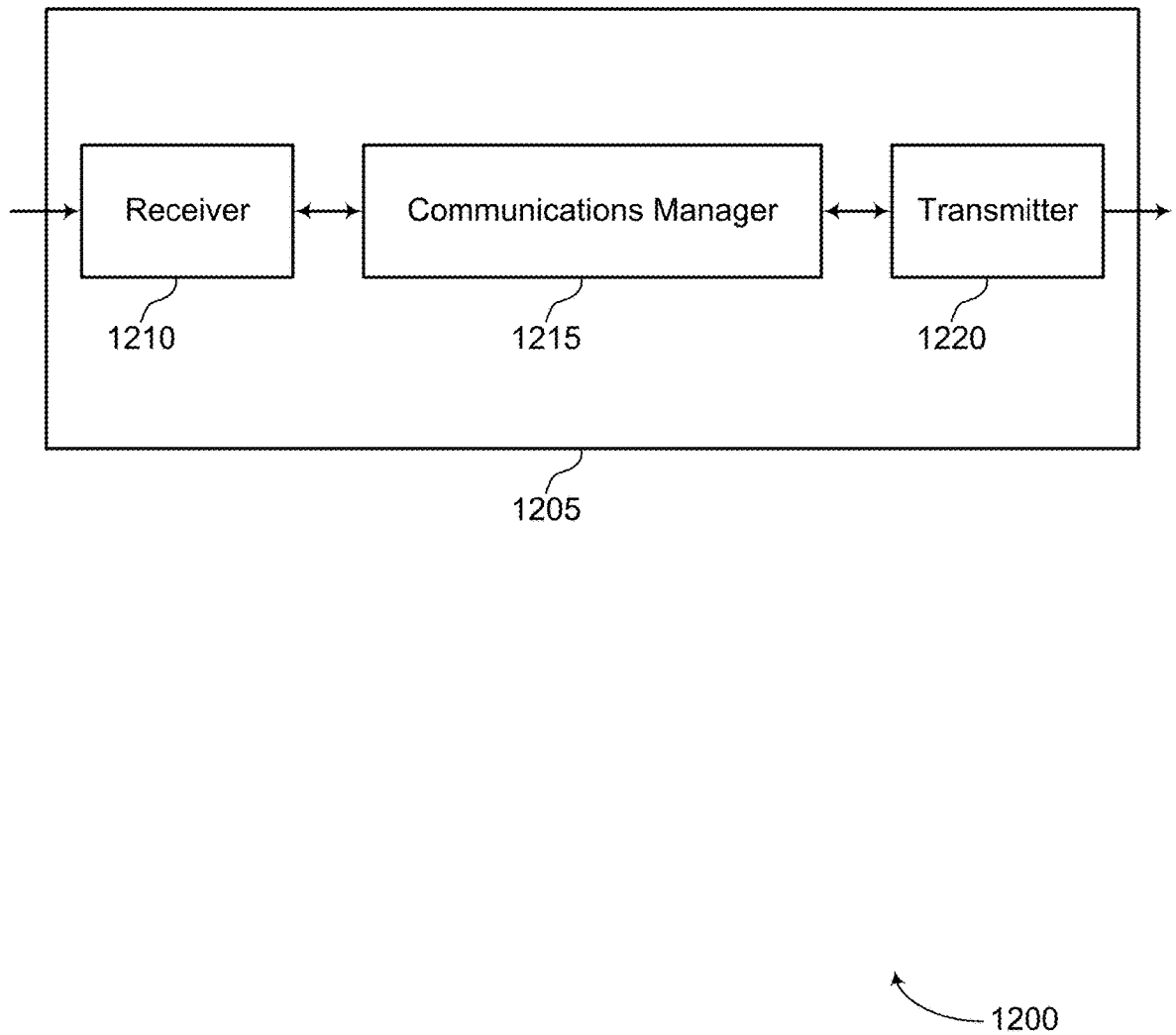
FIGS. 12 and 13 show block diagrams of devices that support techniques for selecting network parameters based on feedback according to some implementations.

FIG. 12 shows a block diagram 1200 of a device 1205 that supports techniques for selecting network parameters based on feedback according to some implementations. The device 1205 may be an example of aspects of a STA as described herein. The device 1205 may include a receiver 1210, a communications manager 1215, and a transmitter 1220. The device 1205 may also include a processor. Each of these components may be in communication with one another (for example, via one or more buses).

Receiver 1210 may receive information such as packets, user data, or control information associated with various information channels (for example, control channels, data channels, and information related to techniques for selecting network parameters based on feedback, etc.). Information may be passed on to other components of the device. The receiver 1210 may be an example of aspects of the transceiver 1520 described with reference to FIG. 15. The receiver 1210 may utilize a single antenna or a set of antennas.

The communications manager 1215 may receive, from an access point, an indication requesting feedback from the station about a selection of one or more network parameters, receive, from the access point, a request for transmission of the feedback identified in the indication to the access point, select a network parameter based on receiving the indication, and transmit, on a channel, energy indicating the selected network parameter based on receiving the request. In some implementations, the communications manager 1215 may transmit, on a channel, one or more characteristics indicating the selected network parameter based at least in part on receiving the request. The communications manager 1215 may be an example of aspects of the communications manager 1510 described herein.

The communications manager 1215, or its sub-components, may be implemented in hardware, code (for example, software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at different locations, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
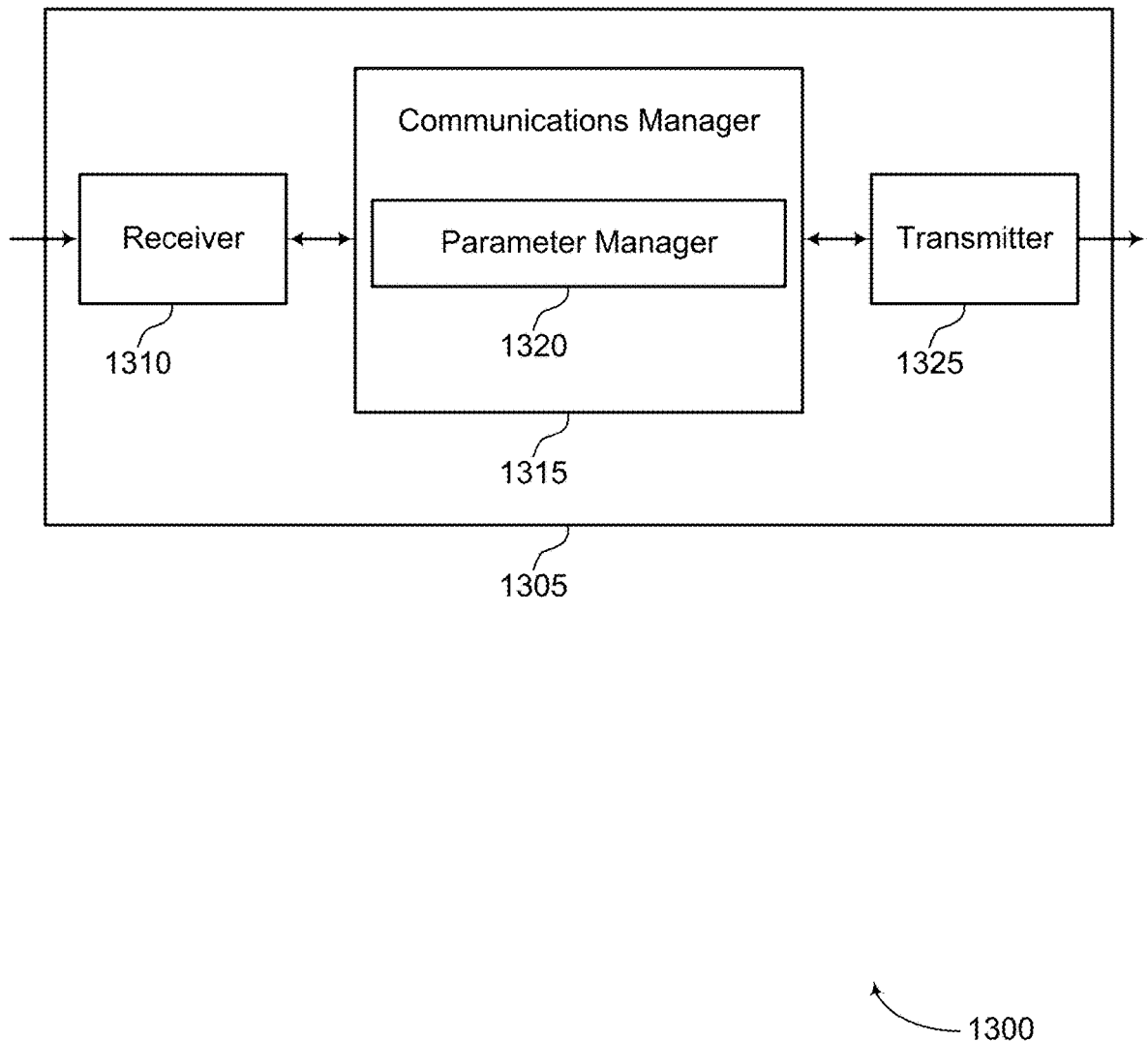

FIG. 13 shows a block diagram 1300 of a device 1305 that supports techniques for selecting network parameters based on feedback according to some implementations. The device 1305 may be an example of aspects of a device 1205 or a STA 115 as described herein. The device 1305 may include a receiver 1310, a communications manager 1315, and a transmitter 1325. The device 1305 may also include a processor. Each of these components may be in communication with one another (for example, via one or more buses).

Receiver 1310 may receive information such as packets, user data, or control information associated with various information channels (for example, control channels, data channels, and information related to techniques for selecting network parameters based on feedback, etc.). Information may be passed on to other components of the device. The receiver 1310 may be an example of aspects of the transceiver 1520 described with reference to FIG. 15. The receiver 1310 may utilize a single antenna or a set of antennas. The receiver 1310 may receive, from an access point, an indication requesting feedback from the station about a selection of one or more network parameters and receive, from the access point, a request for transmission of the feedback identified in the indication to the access point.

The communications manager 1315 may be an example of aspects of the communications manager 1215 as described herein. The communications manager 1315 may include a parameter manager 1320. The communications manager 1315 may be an example of aspects of the communications manager 1510 described herein. The parameter manager 1320 may select a network parameter based on receiving the indication.

The transmitter 1325 may transmit, on a channel, energy indicating the selected network parameter based on receiving the request. In some implementations, the transmitter 1325 may transmit, on a channel, one or more characteristics indicating the selected network parameter based on receiving the request. Transmitter 1325 may transmit signals generated by other components of the device. In some examples, the transmitter 1325 may be collocated with a receiver 1310 in a transceiver module. For example, the transmitter 1325 may be an example of aspects of the transceiver 1520 described with reference to FIG. 15. The transmitter 1325 may utilize a single antenna or a set of antennas.

Figure 14:
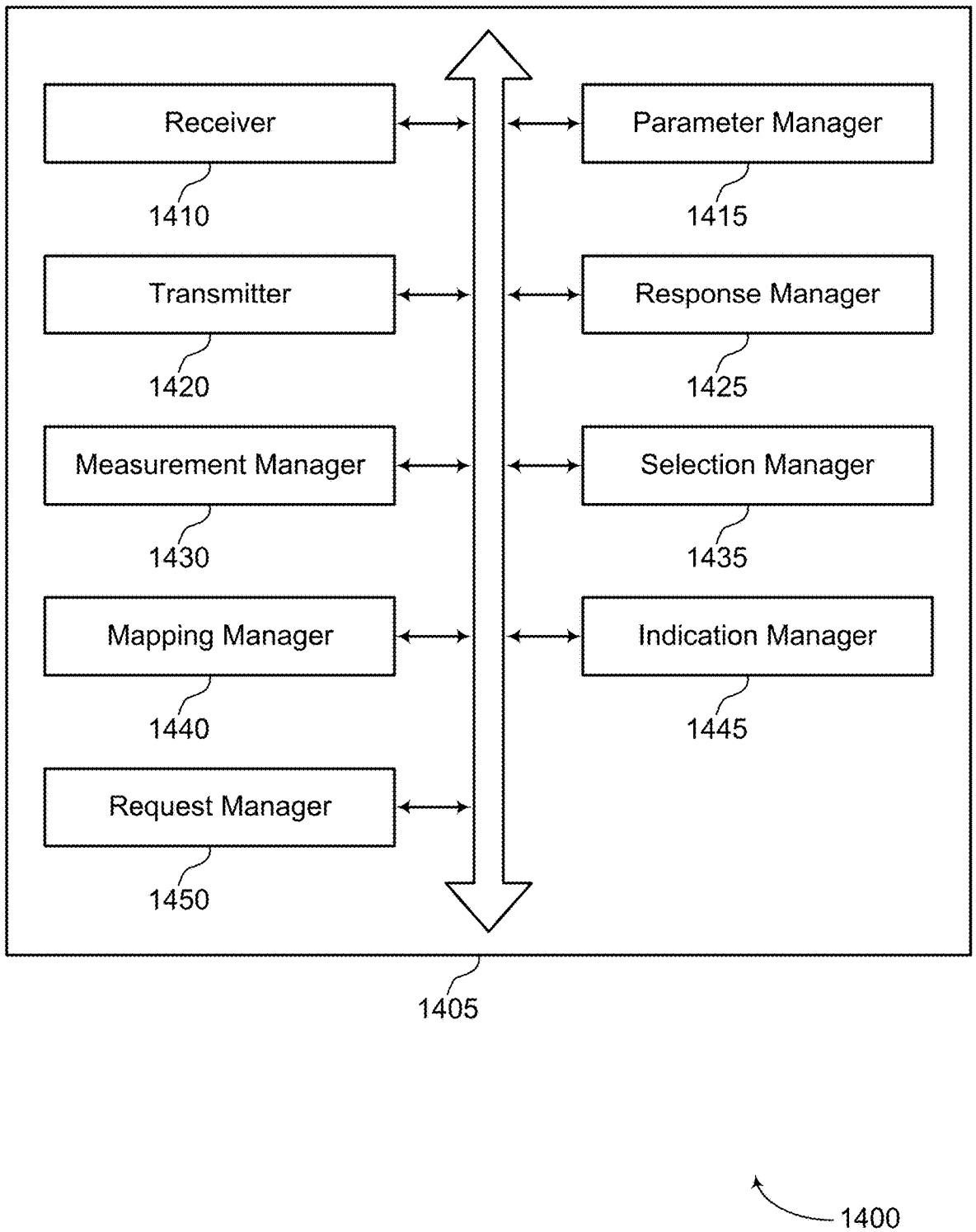
FIG. 14 shows a block diagram of a communications manager that supports techniques for selecting network parameters based on feedback according to some implementations.

FIG. 14 shows a block diagram 1400 of a communications manager 1405 that supports techniques for selecting network parameters based on feedback according to some implementations. The communications manager 1405 may be an example of aspects of a communications manager 1215, a communications manager 1315, or a communications manager 1510 described herein. The communications manager 1405 may include a receiver 1410, a parameter manager 1415, a transmitter 1420, a response manager 1425, a measurement manager 1430, a selection manager 1435, a mapping manager 1440, an indication manager 1445, and a request manager 1450. Each of these modules may communicate, directly or indirectly, with one another (for example, via one or more buses).

The receiver 1410 may receive, from an access point, an indication requesting feedback from the station about a selection of one or more network parameters. In some examples, the receiver 1410 may receive, from the access point, a request for transmission of the feedback identified in the indication to the access point.

The parameter manager 1415 may select a network parameter based on receiving the indication.

The transmitter 1420 may transmit, on a channel, energy indicating the selected network parameter based on receiving the request. In some implementations, the transmitter 1420 may transmit, on a channel, one or more characteristics indicating the selected network parameter based on receiving the request.

The response manager 1425 may transmit, to the access point, a response that includes data indicating the selected network parameter. In some implementations, the response includes a single bit representing a binary response to the indication requesting feedback, or a set of bits representing a value in response to the indication requesting feedback, or a combination thereof.

The measurement manager 1430 may measure one or more characteristics of a communication link based on receiving the indication, where identifying the network parameter is based on measuring the one or more characteristics.

The selection manager 1435 may select a channel candidate from the list of channel candidates based on the receiving the indication, where the selected network parameter includes the selected channel candidate. In some examples, the selection manager 1435 may select a frequency spectrum band candidate from the list of frequency spectrum band candidates based on the receiving the indication, where the selected network parameter is the selected frequency spectrum band candidate.

In some examples, the selection manager 1435 may select a BSS candidate from the list of BSS candidates based on the receiving the indication, where the selected network parameter is the selected BSS candidate. In some examples, the selection manager 1435 may identify the channel for transmitting the energy based on information included in the request, or the indication, or both. In some examples, the selection manager 1435 may identify the channel for transmitting the one or more characteristics based on information included in the request, or the indication, or both.

In some examples, the selection manager 1435 may select a spatial reuse parameter for a BSS based on the receiving the indication, where the selected network parameter is the selected spatial reuse parameter. In some examples, selecting a transmit power level for a BSS based on the receiving the indication, where the identified selected parameter includes the transmit power level. In some examples, selecting a BSS color candidate from the list of BSS color candidates based on the receiving the indication, where the selected network parameter includes the selected BSS color candidate. In some implementations, the channel used for transmitting the energy is the channel candidate selected by the station. In some implementations, the channel used for transmitting the one or more characteristics is the channel candidate selected by the station. In some implementations, the indication includes a PCN field for each channel candidate of the list of channel candidates. In some implementations, the spatial reuse parameter includes a level of interference detected from a neighbor, a type of a spatial reuse mechanism, a preamble detection threshold, an energy detection threshold, a mid-amble detect threshold, or a BSS operating channel width, or a combination thereof.

The mapping manager 1440 may identify a set of channels associated with a set of responses to the indication requesting feedback based on information included in the request, where the channel on which the energy is transmitted includes one of the set of channels. In some implementations, the mapping manager 1440 may identify a set of channels associated with a set of responses to the indication requesting feedback based on information included in the request, where the channel on which the one or more characteristics are transmitted includes one of the set of channels.

The indication manager 1445 may be associated with functions and contents of the indication. In some implementations, the indication requesting feedback includes a request for a list of radio access technologies accessible by the station, a request for a SINR for a certain channel, a request for a RSSI for the certain channel, a request for a number of corrupted frames received within a MPDU, a request to identify corrupted frames, a request for instantaneous interference levels for the certain channel, a request for a multicast rate selection, a request for a minimum contention window adjustment based on a number of collisions or retransmission experienced by the station, or an EDCA parameter adjustment based on a number of collisions or retransmission experienced by the set of stations, or a combination thereof. In some implementations, the indication is included in a beacon frame, and where the request is included in a feedback report poll trigger frame. In some implementations, the indication includes a target beacon transmit time that indicates a duration between receiving the indication and receiving the request.

The request manager 1450 may be associated with functions and contents of the request. In some implementations, the request includes a type of the feedback requested, a range of the indication requesting feedback, a class of stations to respond to the indication requesting feedback, or a combination thereof. In some implementations, the class of stations includes stations associated with the access point, stations not associated with the access point, stations associated with other access points, other access points, or a combination thereof.

Figure 15:
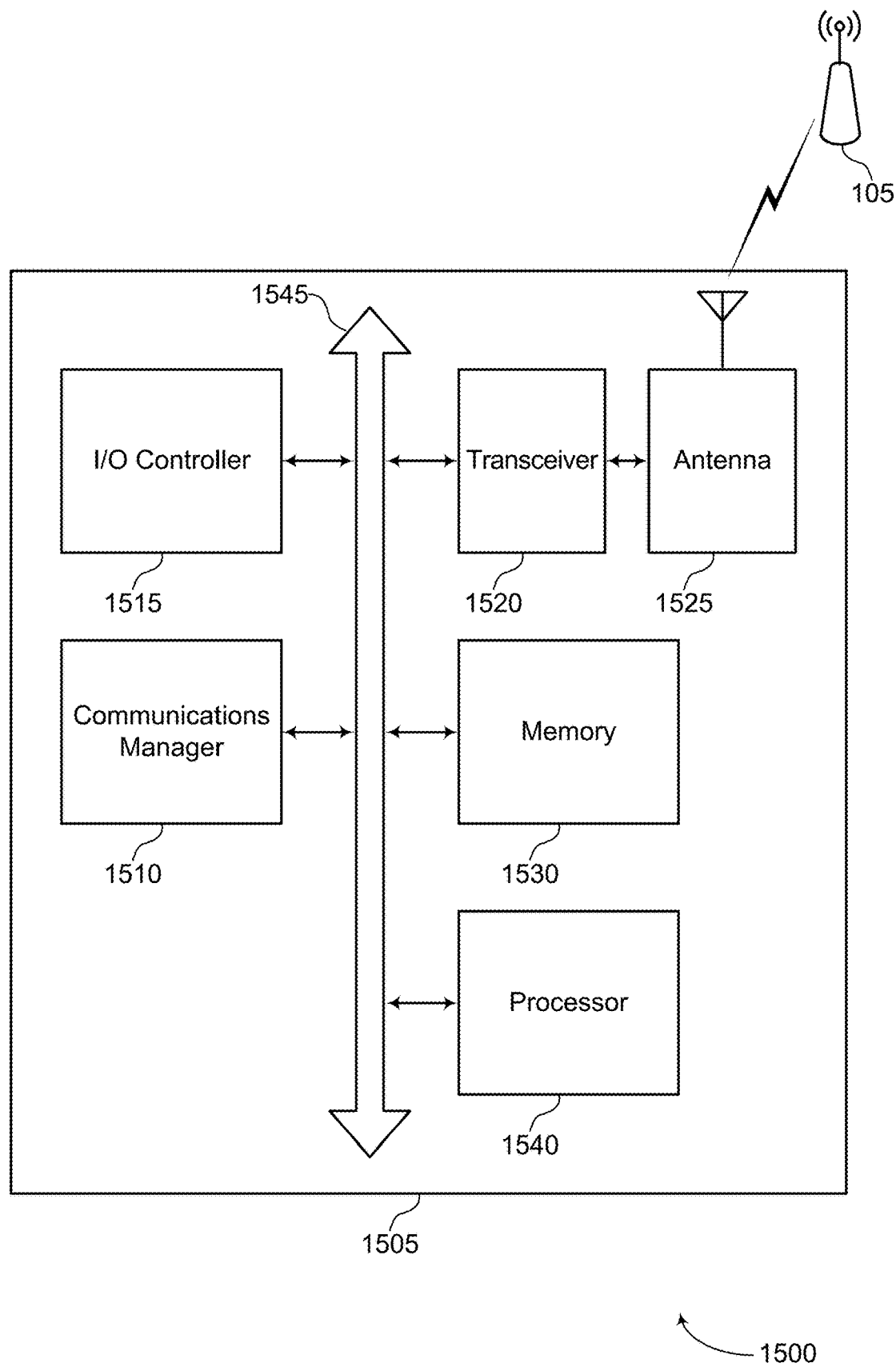
FIG. 15 shows a diagram of a system including a device that supports techniques for selecting network parameters based on feedback according to some implementations.

FIG. 15 shows a diagram of a system 1500 including a device 1505 that supports techniques for selecting network parameters based on feedback according to some implementations. The device 1505 may be an example of or include the components of device 1205, device 1305, or a STA as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (for example, bus 1545).

The communications manager 1510 may receive, from an access point, an indication requesting feedback from the station about a selection of one or more network parameters, receive, from the access point, a request for transmission of the feedback identified in the indication to the access point, select a network parameter based on receiving the indication, and transmit, on a channel, energy indicating the selected network parameter based on receiving the request. In some implementations, the communications manager 1510 may transmit, on a channel, one or more characteristics indicating the selected network parameter based on receiving the request.

I/O controller 1515 may manage input and output signals for device 1505. I/O controller 1515 may also manage peripherals not integrated into device 1505. In some implementations, I/O controller 1515 may represent a physical connection or port to an external peripheral. In some implementations, I/O controller 1515 may utilize an operating system such as iOS®, ANDROID®, MS-DOS®, MS-WINDOWS®, OS/2®, UNIX®, LINUX®, or another known operating system. In other implementations, I/O controller 1515 may represent or interact with a modem, a keyboard, a mouse, a touchscreen, or a similar device. In some implementations, I/O controller 1515 may be implemented as part of a processor. In some implementations, a user may interact with device 1505 via I/O controller 1515 or via hardware components controlled by I/O controller 1515.

Transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some implementations, the wireless device may include a single antenna 1525. However, in some implementations the device may have more than one antenna 1525, which may be capable of concurrently transmitting or receiving multiple wireless transmissions.

Memory 1530 may include RAM and ROM. The memory 1530 may store computer-readable, computer-executable software 1535 including instructions that, when executed, cause the processor to perform various functions described herein. In some implementations, the memory 1530 may contain, among other things, a BIOS which may control basic hardware or software operation such as the interaction with peripheral components or devices.

Processor 1540 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, processor 1540 may be configured to operate a memory array using a memory controller. In other implementations, a memory controller may be integrated into processor 1540. Processor 1540 may be configured to execute computer-readable instructions stored in a memory to perform various functions (for example, functions or tasks supporting techniques for selecting network parameters based on feedback).

Figure 16:
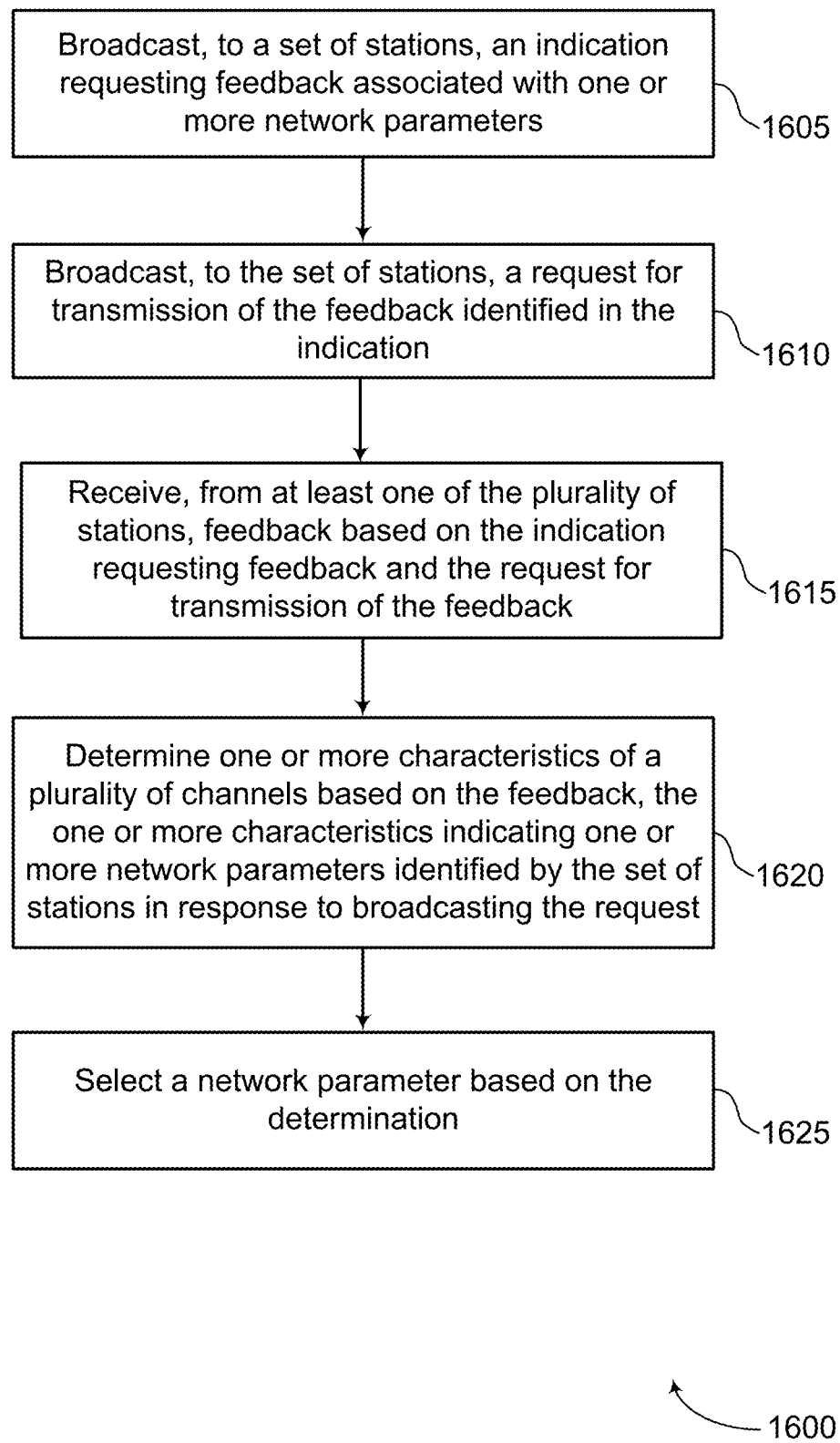
FIGS. 16 through 19 show flowcharts illustrating methods that support techniques for selecting network parameters based on feedback according to some implementations.

FIG. 16 shows a flowchart illustrating a method 1600 that supports techniques for selecting network parameters based on feedback according to some implementations. The operations of method 1600 may be implemented by an AP or its components as described herein. For example, the operations of method 1600 may be performed by a communications manager as described with reference to FIGS. 8 through 11. In some examples, an AP may execute a set of instructions to control the functional elements of the AP to perform the functions described herein. Additionally or alternatively, an AP may perform aspects of the functions described herein using special-purpose hardware.

At 1605, the AP may broadcast, to a set of stations, an indication requesting feedback associated with one or more network parameters. The operations of 1605 may be performed according to the methods described herein. In some example embodiments, aspects of the operations of 1605 may be performed by a transmitter as described with reference to FIGS. 8 through 11.

At 1610, the AP may broadcast, to the set of stations, a request for transmission of the feedback identified in the indication. The operations of 1610 may be performed according to the methods described herein. In some examples, aspects of the operations of 1610 may be performed by a transmitter as described with reference to FIGS. 8 through 11.

At 1615, the AP may receive, from at least one of the plurality of stations, feedback based on the indication requesting feedback and the request for the transmission of the feedback.

At 1620, the AP may determine one or more characteristics of a plurality of channels based on the feedback, the one or more characteristics indicating one or more network parameters identified by the set of stations in response to broadcasting the request. The operations of 1615 may be performed according to the methods described herein. In some implementations, the one or more characteristics may be associated with or provide one or more network parameters identified by the set of stations in response to broadcasting the request. In some examples, aspects of the operations of 1615 may be performed by a response manager as described with reference to FIGS. 8 through 11.

At 1625, the AP may select a network parameter based on the determination. The operations of 1620 may be performed according to the methods described herein. In some examples, aspects of the operations of 1620 may be performed by a parameter manager as described with reference to FIGS. 8 through 11.

Figure 17:
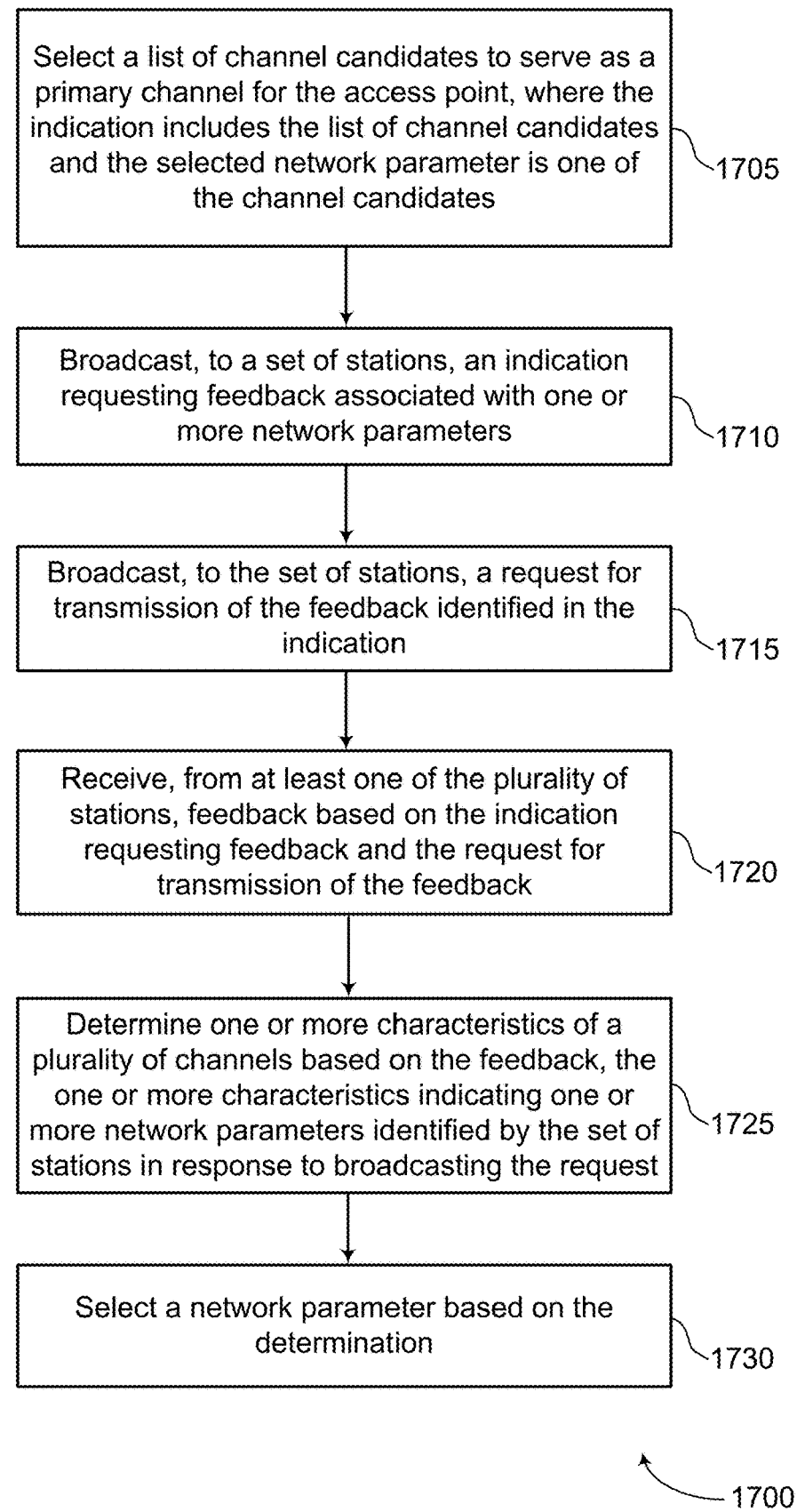

FIG. 17 shows a flowchart illustrating a method 1700 that supports techniques for selecting network parameters based on feedback according to some implementations. The operations of method 1700 may be implemented by an AP or its components as described herein. For example, the operations of method 1700 may be performed by a communications manager as described with reference to FIGS. 8 through 11. In some examples, an AP may execute a set of instructions to control the functional elements of the AP to perform the functions described herein. Additionally or alternatively, an AP may perform aspects of the functions described herein using special-purpose hardware.

At 1705, the AP may select a list of channel candidates to serve as a primary channel for the access point, where the indication includes the list of channel candidates and the selected network parameter is one of the channel candidates. The operations of 1705 may be performed according to the methods described herein. In some examples, aspects of the operations of 1705 may be performed by a candidate manager as described with reference to FIGS. 8 through 11.

At 1710, the AP may broadcast, to a set of stations, an indication requesting feedback associated with one or more network parameters. The operations of 1710 may be performed according to the methods described herein. In some examples, aspects of the operations of 1710 may be performed by a transmitter as described with reference to FIGS. 8 through 11.

At 1715, the AP may broadcast, to the set of stations, a request for transmission of the feedback identified in the indication. The operations of 1715 may be performed according to the methods described herein. In some examples, aspects of the operations of 1715 may be performed by a transmitter as described with reference to FIGS. 8 through 11.

At 1720, the AP may receive, from at least one of the plurality of stations, feedback based on the indication requesting feedback and the request for the transmission of the feedback.

At 1725, the AP may determine one or more characteristics of a plurality of channels based on the feedback, the one or more characteristics indicating one or more network parameters identified by the set of stations in response to broadcasting the request. The operations of 1720 may be performed according to the methods described herein. In some implementations, the one or more characteristics may be associated with or provide one or more network parameters identified by the set of stations in response to broadcasting the request. In some examples, aspects of the operations of 1720 may be performed by a response manager as described with reference to FIGS. 8 through 11.

At 1730, the AP may select a network parameter based on the determination. The operations of 1725 may be performed according to the methods described herein. In some examples, aspects of the operations of 1725 may be performed by a parameter manager as described with reference to FIGS. 8 through 11.

Figure 18:
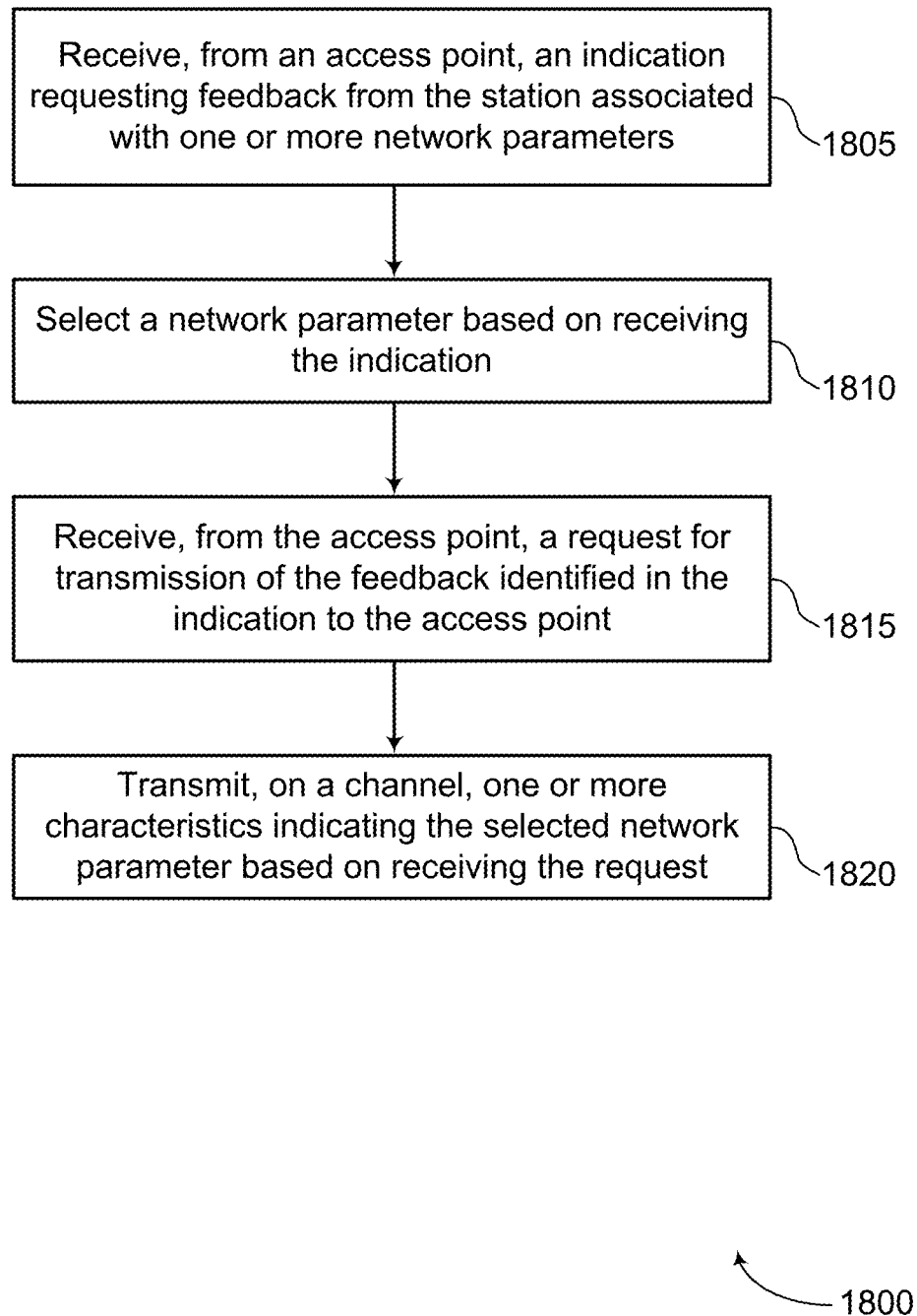

FIG. 18 shows a flowchart illustrating a method 1800 that supports techniques for selecting network parameters based on feedback according to some implementations. The operations of method 1800 may be implemented by a STA or its components as described herein. For example, the operations of method 1800 may be performed by a communications manager as described with reference to FIGS. 12 through 15. In some examples, a STA may execute a set of instructions to control the functional elements of the STA to perform the functions described herein. Additionally or alternatively, a STA may perform aspects of the functions described herein using special-purpose hardware.

At 1805, the STA may receive, from an access point, an indication requesting feedback from the station associated with one or more network parameters. The operations of 1805 may be performed according to the methods described herein. In some examples, aspects of the operations of 1805 may be performed by a receiver as described with reference to FIGS. 12 through 15.

At 1810, the STA may select a network parameter based on receiving the indication. The operations of 1810 may be performed according to the methods described herein. In some examples, aspects of the operations of 1810 may be performed by a parameter manager as described with reference to FIGS. 12 through 15.

At 1815, the STA may receive, from the access point, a request for transmission of the feedback identified in the indication to the access point. The operations of 1815 may be performed according to the methods described herein. In some examples, aspects of the operations of 1815 may be performed by a receiver as described with reference to FIGS. 12 through 15.

At 1820, the STA may transmit, on a channel, one or more characteristics indicating the selected network parameter based on receiving the request. The operations of 1820 may be performed according to the methods described herein. In some examples, aspects of the operations of 1820 may be performed by a transmitter as described with reference to FIGS. 12 through 15.

Figure 19:
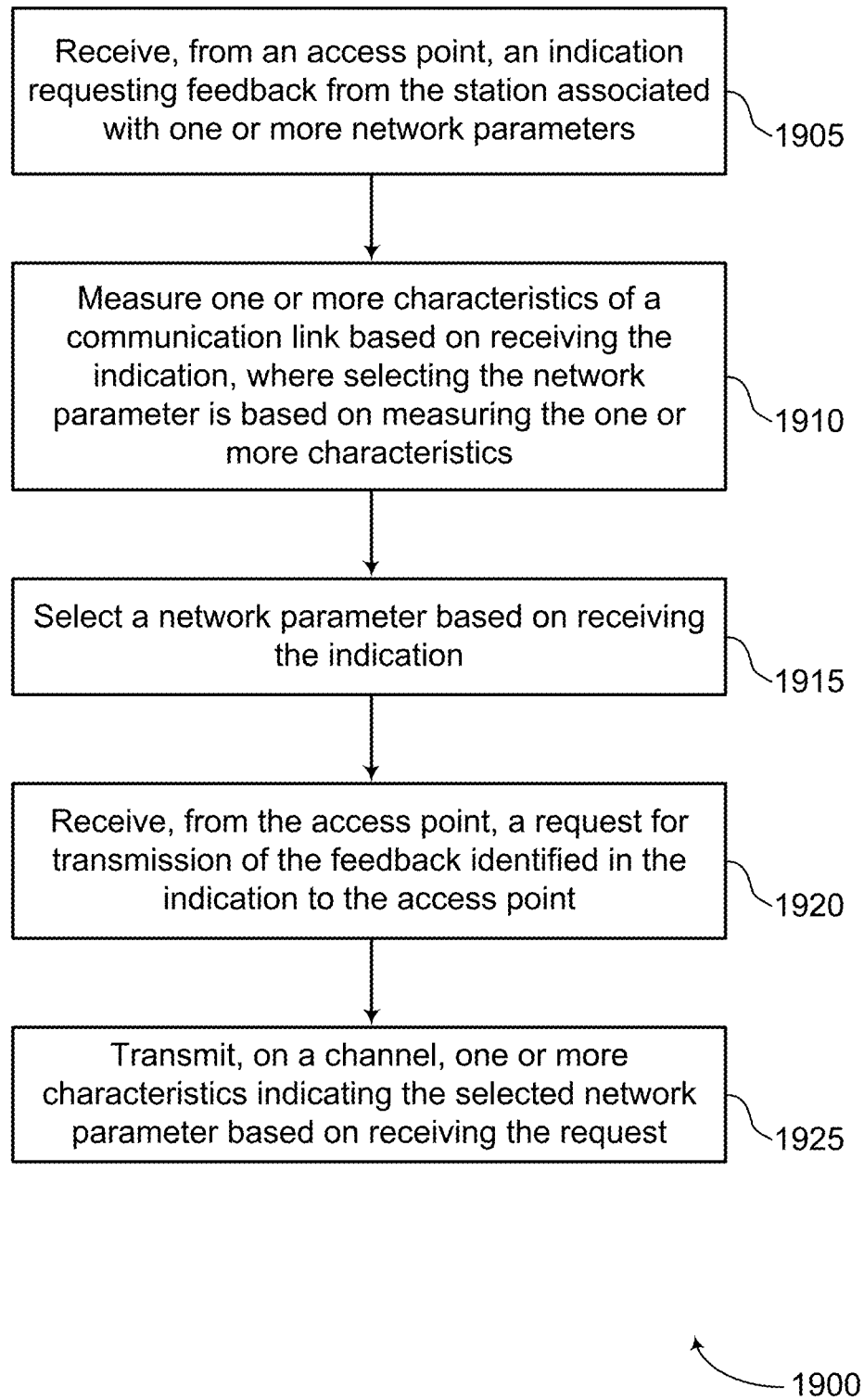

FIG. 19 shows a flowchart illustrating a method 1900 that supports techniques for selecting network parameters based on feedback according to some implementations. The operations of method 1900 may be implemented by a STA or its components as described herein. For example, the operations of method 1900 may be performed by a communications manager as described with reference to FIGS. 12 through 15. In some examples, a STA may execute a set of instructions to control the functional elements of the STA to perform the functions described herein. Additionally or alternatively, a STA may perform aspects of the functions described herein using special-purpose hardware.

At 1905, the STA may receive, from an access point, an indication requesting feedback from the station associated with one or more network parameters. The operations of 1905 may be performed according to the methods described herein. In some examples, aspects of the operations of 1905 may be performed by a receiver as described with reference to FIGS. 12 through 15.

At 1910, the STA may measure one or more characteristics of a communication link based on receiving the indication, where selecting the network parameter is based on measuring the one or more characteristics. The operations of 1910 may be performed according to the methods described herein. In some examples, aspects of the operations of 1910 may be performed by a measurement manager as described with reference to FIGS. 12 through 15.

At 1915, the STA may select a network parameter based on receiving the indication. The operations of 1915 may be performed according to the methods described herein. In some examples, aspects of the operations of 1915 may be performed by a parameter manager as described with reference to FIGS. 12 through 15.

At 1920, the STA may receive, from the access point, a request for transmission of the feedback identified in the indication to the access point. The operations of 1920 may be performed according to the methods described herein. In some examples, aspects of the operations of 1920 may be performed by a receiver as described with reference to FIGS. 12 through 15.

At 1925, the STA may transmit, on a channel, one or more characteristics indicating the selected network parameter based on receiving the request. The operations of 1925 may be performed according to the methods described herein. In some examples, aspects of the operations of 1925 may be performed by a transmitter as described with reference to FIGS. 12 through 15.

It is be noted that the methods described herein describe possible implementations, and that the operations and the blocks may be rearranged or otherwise modified and that other implementations are possible. Furthermore, aspects from two or more of the methods may be combined.

Techniques described herein may be used for various wireless communications systems such as CDMA, TDMA, FDMA, orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as GSM. An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 500 of FIGS. 1 and 5—may include one or more carriers, where each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by an access point, comprising:
   broadcasting, to a plurality of stations, an indication requesting feedback associated with one or more network parameters;
   broadcasting, to the plurality of stations, a request for transmission of the feedback identified in the indication, the request indicating a plurality of channels for transmitting the feedback, each channel of the plurality of channels mapping to a network parameter of the one or more network parameters;
   receiving, from at least one of the plurality of stations, feedback via at least one channel of the plurality of channels associated with the indication requesting feedback and the request for transmission of the feedback, each channel of the plurality of channels indicating, via one or more channel characteristics, a selected network parameter of the at least one of the plurality of stations;
   measuring the one or more channel characteristics of each channel of the plurality of channels associated with the feedback, the one or more channel characteristics of each channel indicating a quantity of stations that used the each channel to indicate the network parameter in response to broadcasting the request; and
   communicating with one or more of the plurality of stations in accordance with a first network parameter of the one or more network parameters, wherein communicating in accordance with the first network parameter is based at least in part on comparing the one or more channel characteristics of a channel associated with the first network parameter with one or more second channel characteristics of a second channel associated with a second network parameter of the one or more network parameters, and wherein the one or more channel characteristics of the channel are indicative of the quantity of stations that used the channel to indicate a selection of the first network parameter from the one or more network parameters.

2. The method of claim 1, wherein receiving the feedback comprises receiving, by the access point, a response from at least one of the plurality of stations that includes data indicating the one or more network parameters identified by the plurality of stations, the measuring of the one or more channel characteristics of each channel being based at least in part on the data.

3. The method of claim 2, wherein the data includes a single bit representing a binary response to the indication requesting feedback, or a plurality of bits representing a value in response to the indication requesting feedback, or a combination thereof.

4. The method of claim 1, further comprising selecting a list of channel candidates to serve as a primary channel for the access point, wherein the indication includes the list of channel candidates and the selected network parameter is one of the channel candidates.

5. The method of claim 1, wherein receiving the feedback comprises detecting energy levels, or energy patterns, or other signal statistics, on the at least one channel of the plurality of channels, the measuring of the one or more channel characteristics of each channel being based at least in part on the detected energy levels, or energy patterns, or other signal statistics, and the detected energy levels, or energy patterns, or other signal statistics being configured to indicate the one or more network parameters identified by the plurality of stations in response to broadcasting the request.

6. The method of claim 5, further comprising comparing energy detected on a first channel to energy detected on a second channel, wherein selecting the first network parameter is based at least in part on a difference in the energy detected on the first channel and the energy detected on the second channel.

7. The method of claim 1, wherein the one or more channel characteristics of each channel includes at least one of an energy detected on at least one channel of the plurality of channels, a quantity of stations using at least one channel of the plurality of channels, a quantity of stations contending for access to at least one channel of the plurality of channels, a quantity of packets being communicated over at least one channel of the plurality of channels, or a quantity of packets.

8. The method of claim 1, further comprising selecting a list of frequency spectrum band candidates associated with a primary channel for the access point, wherein the indication includes the list of frequency spectrum band candidates and the selected network parameter is one of the frequency spectrum band candidates.

9. The method of claim 1, further comprising selecting a list of basic service set (BSS) candidates associated with a primary channel for the access point, wherein the indication includes the list of BSS candidates and the selected network parameter is one of the BSS candidates.

10. The method of claim 1, further comprising mapping a plurality of responses to the indication to the plurality of channels, wherein selecting the first network parameter is based at least in part on the mapping of the plurality of responses to the plurality of channels.

11. The method of claim 1, further comprising identifying a spatial reuse parameter for a basic service set (BSS), wherein the indication requesting feedback includes the spatial reuse parameter.

12. The method of claim 1, further comprising identifying a transmit power control parameter, wherein the indication requests a transmit power level for a basic service set (BSS).

13. The method of claim 1, further comprising selecting a list of basic service set (BSS) color candidates, wherein the indication requesting feedback includes a list of BSS color candidates, wherein one of the selected BSS color candidates is the selected network parameter.

14. The method of claim 1, wherein the indication is included in a beacon frame, and wherein the request is included in a feedback report poll trigger frame.

15. The method of claim 1, further comprising identifying a target feedback request transmit time for broadcasting the request, wherein the indication includes the target feedback request transmit time.

16. The method of claim 1, wherein the request includes a type of the feedback requested, a range of the indication requesting feedback, a class of stations to respond to the indication requesting feedback, or a combination thereof.

17. The method of claim 1, wherein the plurality of channels comprises a network.

18. The method of claim 1, wherein the plurality of stations comprises one or more of stations associated with the access point, stations intending to associate with the access point, other access points that are within a transmission range of the access point, stations associated to other access points that are within the transmission range of the access point.

19. The method of claim 1, wherein the indication or the request comprises an identification of stations that are permitted to provide feedback.

20. An access point for wireless communication, comprising:
one or more memories storing processor-executable code; and
one or more processors coupled with the one or more memories and individually or collectively operable to cause the access point to:
broadcast, to a plurality of stations, an indication requesting feedback associated with one or more network parameters;
broadcast, to the plurality of stations, a request for transmission of the feedback identified in the indication, the request indicating a plurality of channels for transmitting the feedback, each channel of the plurality of channels mapping to a network parameter of the one or more network parameters;
receive, from at least one of the plurality of stations, feedback via at least one channel of the plurality of channels associated with the indication requesting feedback and the request for transmission of the feedback, each channel of the plurality of channels indicating, via one or more channel characteristics, a selected network parameter of the at least one of the plurality of stations;
measure the one or more channel characteristics of each channel of the plurality of channels associated with the feedback, the one or more channel characteristics of each channel indicating a quantity of stations that used the each channel to indicate the network parameter in response to broadcasting the request; and
communicate with one or more of the plurality of stations in accordance with a first network parameter of the one or more network parameters, wherein communicating in accordance with the first network parameter is based at least in part on comparing the one or more channel characteristics of a channel associated with the first network parameter with one or more second channel characteristics of a second channel associated with a second network parameter of the one or more network parameters, and wherein the one or more channel characteristics of the channel are indicative of the quantity of stations that used the channel to indicate a selection of the first network parameter from the one or more network parameters.

21. The access point of claim 20, wherein, to receive the feedback, the one or more processors are individually or collectively operable to cause the access point to:
receive, by the access point, a response from at least one of the plurality of stations that includes data indicating the one or more network parameters identified by the plurality of stations, the measuring of the one or more channel characteristics of each channel being based at least in part on the data.

22. The access point of claim 21, wherein the data includes a single bit representing a binary response to the indication requesting feedback, or a plurality of bits representing a value in response to the indication requesting feedback, or a combination thereof.

23. The access point of claim 20, wherein the one or more processors are individually or collectively further operable to cause the access point to:
select a list of channel candidates to serve as a primary channel for the access point, wherein the indication includes the list of channel candidates and the selected network parameter is one of the channel candidates.

24. The access point of claim 20, wherein, to receive the feedback, the one or more processors are individually or collectively operable to cause the access point to:
detect energy levels, or energy patterns, or other signal statistics, on the at least one channel of the plurality of channels, the measuring of the one or more channel characteristics of each channel being based at least in part on the detected energy levels, or energy patterns, or other signal statistics, and the detected energy levels, or energy patterns, or other signal statistics being configured to indicate the one or more network parameters identified by the plurality of stations in response to broadcasting the request.

25. An access point for wireless communication, comprising:
means for broadcasting, to a plurality of stations, an indication requesting feedback associated with one or more network parameters;
means for broadcasting, to the plurality of stations, a request for transmission of the feedback identified in the indication, the request indicating a plurality of channels for transmitting the feedback, each channel of the plurality of channels mapping to a network parameter of the one or more network parameters;

means for receiving, from at least one of the plurality of stations, feedback via at least one channel of the plurality of channels associated with the indication requesting feedback and the request for transmission of the feedback, each channel of the plurality of channels indicating, via one or more channel characteristics, a selected network parameter of the at least one of the plurality of stations;

means for measuring the one or more channel characteristics of each channel of the plurality of channels associated with the feedback, the one or more channel characteristics of each channel indicating a quantity of stations that used the each channel to indicate the network parameter in response to broadcasting the request; and means for communicating with one or more of the plurality of stations in accordance with a first network parameter of the one or more network parameters, wherein communicating in accordance with the first network parameter is based at least in part on comparing the one or more channel characteristics of a channel associated with the first network parameter with one or more second channel characteristics of a second channel associated with a second network parameter of the one or more network parameters, and wherein the one or more channel characteristics of the channel are indicative of the quantity of stations that used the channel to indicate a selection of the first network parameter from the one or more network parameters.

26. The access point of claim 25, wherein the means for receiving the feedback comprise:

means for receiving, by the access point, a response from at least one of the plurality of stations that includes data indicating the one or more network parameters identified by the plurality of stations, the measuring of the one or more channel characteristics of each channel being based at least in part on the data.

27. The access point of claim 26, wherein the data includes a single bit representing a binary response to the indication requesting feedback, or a plurality of bits representing a value in response to the indication requesting feedback, or a combination thereof.

28. A non-transitory computer-readable medium storing code for wireless communication, the code comprising instructions executable by one or more processors to:

broadcast, to a plurality of stations, an indication requesting feedback associated with one or more network parameters;

broadcast, to the plurality of stations, a request for transmission of the feedback identified in the indication, the request indicating a plurality of channels for transmitting the feedback, each channel of the plurality of channels mapping to a network parameter of the one or more network parameters;

receive, from at least one of the plurality of stations, feedback via at least one channel of the plurality of channels associated with the indication requesting feedback and the request for transmission of the feedback, each channel of the plurality of channels indicating, via one or more channel characteristics, a selected network parameter of the at least one of the plurality of stations;

measure the one or more channel characteristics of each channel of the plurality of channels associated with the feedback, the one or more channel characteristics of each channel indicating a quantity of stations that used the each channel to indicate the network parameter in response to broadcasting the request; and communicate with one or more of the plurality of stations in accordance with a first network parameter of the one or more network parameters, wherein communicating in accordance with the first network parameter is based at least in part on comparing the one or more channel characteristics of a channel associated with the first network parameter with one or more second channel characteristics of a second channel associated with a second network parameter of the one or more network parameters, and wherein the one or more channel characteristics of the channel are indicative of the quantity of stations that used the channel to indicate a selection of the first network parameter from the one or more network parameters.

29. The non-transitory computer-readable medium of claim 28, wherein the instructions to receive the feedback are executable by the one or more processors to:

receive, by an access point, a response from at least one of the plurality of stations that includes data indicating the one or more network parameters identified by the plurality of stations, the measuring of the one or more channel characteristics of each channel being based at least in part on the data.

30. The non-transitory computer-readable medium of claim 29, wherein the data includes a single bit representing a binary response to the indication requesting feedback, or a plurality of bits representing a value in response to the indication requesting feedback, or a combination thereof.

* * * * *